US008639878B1

(12) United States Patent  
Chatterjee et al.

(10) Patent No.: US 8,639,878 B1  
(45) Date of Patent: *Jan. 28, 2014

(54) PROVIDING REDUNDANCY IN A STORAGE SYSTEM

(75) Inventors: Paresh Chatterjee, Fremont, CA (US); Ajit Narayanan, Fremont, CA (US); Narayanan Balakrishnan, Milpitas, CA (US); Vijayarankan Muthirisavenugopal, Chennai (IN)

(73) Assignee: American Megatrends, Inc., Norcross, GA (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/204,070

(22) Filed: Aug. 5, 2011

Related U.S. Application Data

(63) Continuation of application No. 11/551,291, filed on Oct. 20, 2006, now Pat. No. 7,996,608.

(60) Provisional application No. 60/728,280, filed on Oct. 20, 2005, provisional application No. 60/728,666, filed on Oct. 20, 2005.

(51) Int. Cl.  
*G06F 12/00* (2006.01)  
*G06F 13/00* (2006.01)  
*G06F 13/28* (2006.01)

(52) U.S. Cl.  
USPC ........................................... 711/114

(58) Field of Classification Search  
None  
See application file for complete search history.

(56) References Cited

U.S. PATENT DOCUMENTS

| 4,849,978 A | 7/1989 | Dishon et al. |
| 4,942,579 A | 7/1990 | Goodlander et al. |
| 5,257,367 A | 10/1993 | Goodlander et al. |
| 5,488,716 A | 1/1996 | Schneider et al. |
| 5,524,204 A | 6/1996 | Verdoorn, Jr. |
| 5,678,061 A | 10/1997 | Mourad |
| 5,720,027 A | 2/1998 | Sarkozy et al. |
| 5,732,238 A | 3/1998 | Sarkozy |
| 5,787,459 A | 7/1998 | Stallmo et al. |
| 5,790,774 A | 8/1998 | Sarkozy |
| 5,893,919 A | 4/1999 | Sarkozy et al. |
| 5,907,849 A | 5/1999 | Dias et al. |

(Continued)

OTHER PUBLICATIONS

U.S. Official Action, dated Nov. 16, 2011, received in connection with related U.S. Appl. No. 13/046,857.

(Continued)

*Primary Examiner* — Christian P Chace  
*Assistant Examiner* — Gary W Cygiel  
(74) *Attorney, Agent, or Firm* — Meunier Carlin & Curfman, LLC

(57) ABSTRACT

A system, method, apparatus, and computer-readable medium are described for providing redundancy in a storage system. According to one method, maps are generated and stored that define stripe patterns for storing data on the storage nodes of a storage cluster. The maps are defined such that when a new storage node is added to the cluster, no movement of data occurs between two storage nodes that existed in the cluster prior to the addition of the new storage node during re-striping, and such that the data stored on each storage node is mirrored on another storage node. Storage nodes may also be designated as an owner or a peer for each storage zone. Input/output operations received at an owner node are fielded directly and mirrored to the peer node, while input/output operations received at a peer node are redirected to the owner node for processing.

9 Claims, 18 Drawing Sheets

(56) References Cited

U.S. PATENT DOCUMENTS

| | | | |
|---|---|---|---|
| 5,974,426 | A | 10/1999 | Lee et al. |
| 6,098,128 | A | 8/2000 | Velez-McCaskey et al. |
| 6,105,122 | A | 8/2000 | Muller et al. |
| 6,108,748 | A | 8/2000 | Ofek et al. |
| 6,128,654 | A | 10/2000 | Runaldue et al. |
| 6,173,377 | B1 | 1/2001 | Yanai et al. |
| 6,282,619 | B1 | 8/2001 | Islam et al. |
| 6,289,398 | B1 | 9/2001 | Stallmo et al. |
| 6,502,166 | B1 | 12/2002 | Cassidy |
| 6,629,203 | B1 | 9/2003 | Humlicek |
| 6,671,705 | B1 | 12/2003 | Duprey et al. |
| 6,785,678 | B2 | 8/2004 | Price |
| 6,826,711 | B2 | 11/2004 | Moulton et al. |
| 7,069,385 | B2 | 6/2006 | Fujimoto et al. |
| 7,089,448 | B2 | 8/2006 | Hinshaw et al. |
| 7,155,466 | B2 | 12/2006 | Rodriguez et al. |
| 7,159,150 | B2 | 1/2007 | Kenchammana-Hosekote et al. |
| 7,231,493 | B2 | 6/2007 | Nguyen et al. |
| 7,315,958 | B1 | 1/2008 | Bridge, Jr. |
| 7,366,837 | B2 | 4/2008 | Corbett et al. |
| 7,437,507 | B2 | 10/2008 | Sharma et al. |
| 7,457,980 | B2 | 11/2008 | Yang et al. |
| 7,664,793 | B1 | 2/2010 | Kekre et al. |
| 7,908,448 | B1 | 3/2011 | Chatterjee et al. |
| 7,996,608 | B1 | 8/2011 | Chatterjee et al. |
| 2002/0059540 | A1 | 5/2002 | Mann et al. |
| 2002/0083036 | A1 | 6/2002 | Price |
| 2002/0091746 | A1 | 7/2002 | Umberger et al. |
| 2003/0088803 | A1 | 5/2003 | Arnott et al. |
| 2003/0105923 | A1 | 6/2003 | Bak et al. |
| 2003/0158862 | A1 | 8/2003 | Eshel et al. |
| 2003/0221063 | A1 | 11/2003 | Eguchi et al. |
| 2004/0039888 | A1 | 2/2004 | LeCrone et al. |
| 2004/0044865 | A1 | 3/2004 | Sicola et al. |
| 2004/0073831 | A1 | 4/2004 | Yanai et al. |
| 2004/0250031 | A1 | 12/2004 | Ji et al. |
| 2004/0255189 | A1 | 12/2004 | Chu et al. |
| 2005/0071389 | A1 | 3/2005 | Gupta |
| 2005/0091391 | A1 | 4/2005 | Burton et al. |
| 2005/0102551 | A1 | 5/2005 | Watanabe |
| 2005/0114350 | A1 | 5/2005 | Rose et al. |
| 2005/0273565 | A1 | 12/2005 | Hirakawa et al. |
| 2005/0273645 | A1 | 12/2005 | Satran et al. |
| 2006/0117212 | A1 | 6/2006 | Meyer et al. |
| 2006/0184731 | A1* | 8/2006 | Corbett et al. ............... 711/114 |
| 2006/0236064 | A1 | 10/2006 | Niles et al. |
| 2007/0011425 | A1 | 1/2007 | Sicola |
| 2007/0254922 | A1 | 11/2007 | Hiraiwa et al. |
| 2007/0271422 | A1 | 11/2007 | Osaki |
| 2007/0283348 | A1 | 12/2007 | White |
| 2008/0016301 | A1 | 1/2008 | Chen |
| 2008/0046612 | A1 | 2/2008 | Beardsley et al. |
| 2008/0059734 | A1 | 3/2008 | Mizuno |
| 2008/0109601 | A1 | 5/2008 | Lemm et al. |
| 2009/0037679 | A1 | 2/2009 | Kaushik et al. |

OTHER PUBLICATIONS

U.S. Official Action, dated Dec. 6, 2011, received in connection with related U.S. Appl. No. 12/013,124.

U.S. Appl. No. 13/220,299, filed Aug. 29, 2011, entitled "Background Movement of Data Between Nodes in a Storage Cluster," Inventors: Chatterjee et al.

U.S. Appl. No. 13/220,305, filed Aug. 29, 2011, entitled "Distributed Hot-Spare Storage in a Storage Cluster," Inventors: Chatterjee et al.

U.S. Appl. No. 13/046,857, filed Mar. 14, 2011, entitled "Maintaining Data Consistency in Mirrored Cluster Storage Systems With Write-Back Cache," Inventors: Chatterjee et al.

U.S. Appl. No. 12/857,050, filed Aug. 16, 2010, entitled "Background Movement of Data Between Nodes in a Storage Cluster," Inventors: Chatterjee et al.

U.S. Notice of Allowance / Allowability dated Apr. 15, 2011 in U.S. Appl. No. 12/857,050.

U.S. Official Action dated Jan. 21, 2011 in U.S. Appl. No. 12/857,050.

U.S. Appl. No. 12/721,900, filed Mar. 11, 2010, entitled "Expanding the Storage Capacity of a Virtualized Data Storage System," Inventors: Chatterjee et al.

U.S. Notice of Allowance / Allowability dated Jan. 24, 2011 in U.S. Appl. No. 12/721,900.

U.S. Appl. No. 12/104,129, filed Apr. 16, 2008, entitled "Low Latency Synchronous Replication Using an N-Way Router," Inventors: Chatterjee et al.

U.S. Notice of Allowance / Allowability dated Sep. 28, 2011 in U.S. Appl. No. 12/104,129.

U.S. Official Action dated Mar. 22, 2011 in U.S. Appl. No. 12/104,129.

U.S. Appl. No. 12/013,124, filed Jan. 11, 2008, entitled "Two-Node High Availability Cluster Storage Solution Using an Intelligent Initiator to Avoid Split Brain Syndrome," Inventors: Chatterjee et al.

U.S. Official Action dated Mar. 7, 2011 in U.S. Appl. No. 12/013,124.

U.S. Appl. No. 12/013,116, filed Jan. 11, 2008, entitled "Maintaining Data Consistency in Mirrored Cluster Storage Systems With Write-Back Cache," Inventors: Chatterjee et al.

U.S. Official Action dated Jul. 8, 2010 in U.S. Appl. No. 12/013,116.

U.S. Appl. No. 12/013,110, filed Jan. 11, 2008, entitled "Maintaining Data Consistency in Mirrored Cluster Storage Systems Using Bitmap Write-Intent Logging," Inventors: Chatterjee et al.

U.S. Notice of Allowance / Allowability dated Apr. 12, 2011 in U.S. Appl. No. 12/013,110.

U.S. Official Action dated Nov. 22, 2010 in U.S. Appl. No. 12/013,110.

U.S. Official Action dated Jul. 9, 2010 in U.S. Appl. No. 12/013,110.

U.S. Appl. No. 11/695,854, filed Apr. 3, 2007, entitled "Asynchronous Data Replication," Inventors: Chatterjee et al.

U.S. Official Action dated Oct. 14, 2009 in U.S. Appl. No. 11/695,854.

U.S. Official Action dated Apr. 30, 2009 in U.S. Appl. No. 11/695,854.

U.S. Appl. No. 11/551,274, filed Oct. 20, 2006, entitled "Expanding the Storage Capacity of a Virtualized Data Storage System," Inventors: Chatterjee et al.

U.S. Notice of Allowance / Allowability dated Dec. 2, 2009 in U.S. Appl. No. 11/551,274.

U.S. Official Action dated May 13, 2009 in U.S. Appl. No. 11/551,274.

U.S. Official Action dated Dec. 29, 2008 in U.S. Appl. No. 11/551,274.

U.S. Appl. No. 11/551,291, filed Oct. 20, 2006, entitled "Providing Redundancy in a Storage System," Inventors: Chatterjee et al.

U.S. Notice of Allowance / Allowability dated Mar. 28, 2011 in U.S. Appl. No. 11/551,291.

U.S. Official Action dated Dec. 10, 2010 in U.S. Appl. No. 11/551,291.

U.S. Official Action dated Oct. 5, 2009 in U.S. Appl. No. 11/551,291.

U.S. Official Action dated Mar. 20, 2009 in U.S. Appl. No. 11/551,291.

U.S. Appl. No. 11/551,311, filed Oct. 20, 2006, entitled "Distributed Hot-Spare Storage in a Storage Cluster," Inventors: Chatterjee et al.

U.S. Notice of Allowance / Allowability dated Apr. 27, 2011 in U.S. Appl. No. 11/551,311.

U.S. Official Action dated Jul. 22, 2010 in U.S. Appl. No. 11/551,311.

U.S. Official Action dated Dec. 28, 2009 in U.S. Appl. No. 11/551,311.

U.S. Official Action dated Jul. 8, 2009 in U.S. Appl. No. 11/551,311.

U.S. Official Action dated Dec. 23, 2008 in U.S. Appl. No. 11/551,311.

U.S. Appl. No. 11/551,303, filed Oct. 20, 2006, entitled "Background Movement of Data Between Nodes in a Storage Cluster," Inventors: Chatterjee et al.

U.S. Notice of Allowance / Allowability dated Mar. 23, 2010 in U.S. Appl. No. 11/551,303.

U.S. Official Action dated Aug. 17, 2009 in U.S. Appl. No. 11/551,303.

(56) References Cited

OTHER PUBLICATIONS

U.S. Official Action dated Jul. 28, 2008 in U.S. Appl. No. 11/551,303.
U.S. Appl. No. 11/857,050, filed Aug. 16, 2010, entitled "Distributed Hot-Spare Storage in a Storage Cluster," Inventors: Chatterjee et al.
"PRO/10 Adapter: Reducing Bottlenecks for Maximum Performance," Intel, 2004, URL: http://www.intel.com/support/network/adapter/pro100/sb/cs-010531.htm.
U.S. Official Action, dated Jan. 10, 2012, received in connection with related U.S. Appl. No. 13/242,259.

\* cited by examiner

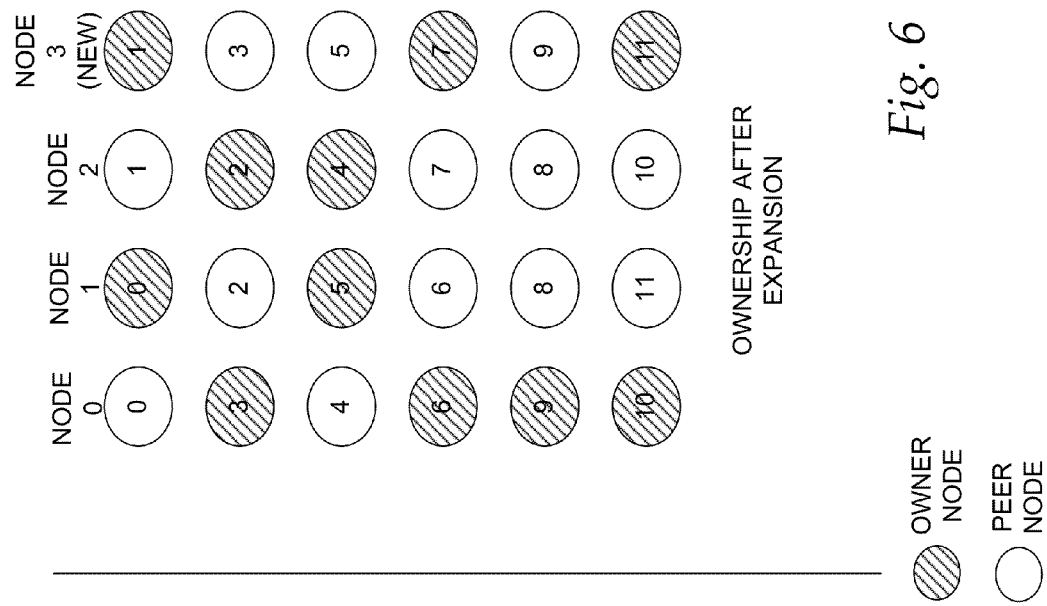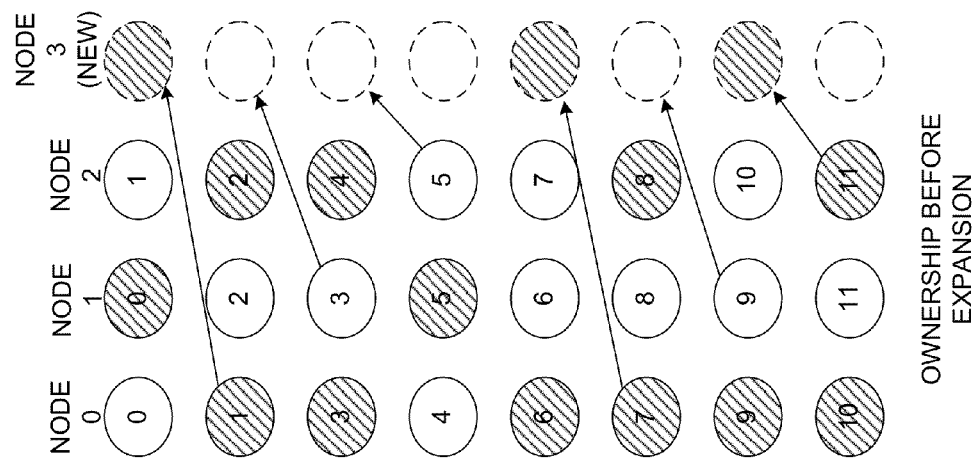
Fig. 6

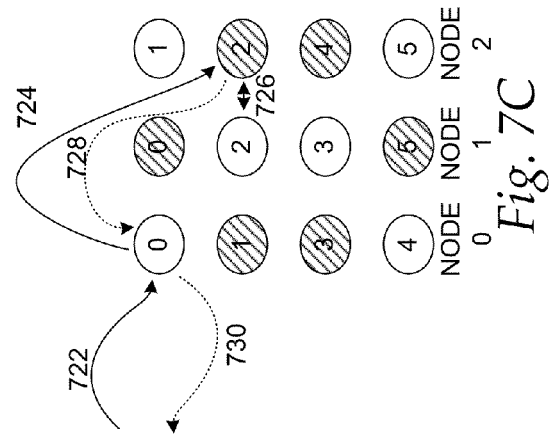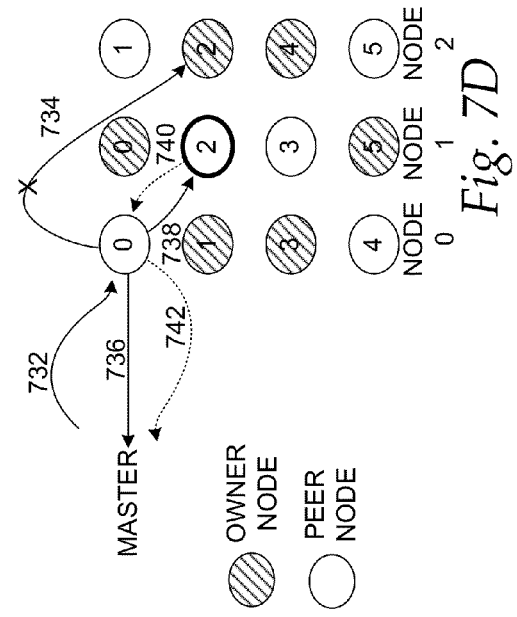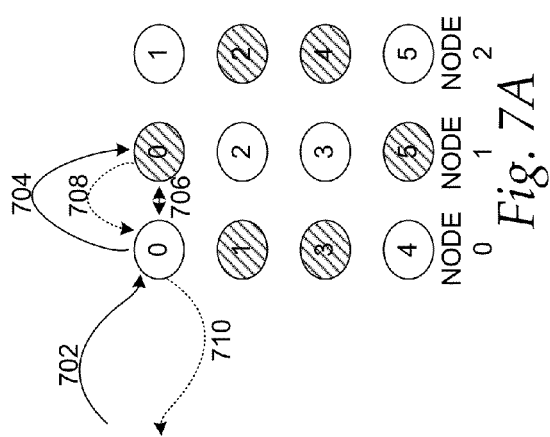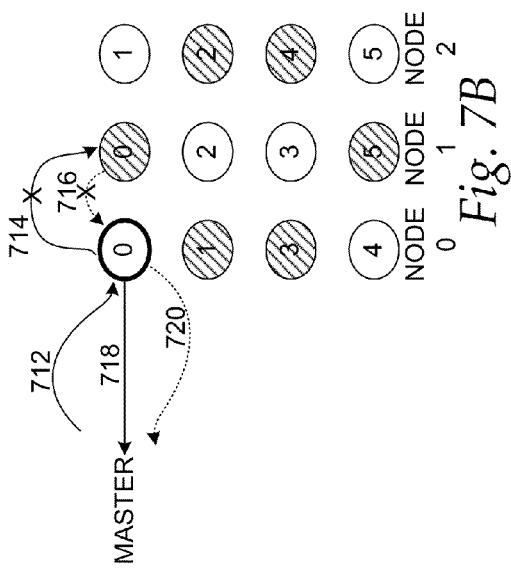

PROVIDING REDUNDANCY IN A STORAGE SYSTEM

CROSS-REFERENCE TO RELATED APPLICATIONS

This application is a continuation of U.S. patent application Ser. No. 11/551,291, filed Oct. 20, 2006, and entitled "Providing Redundancy in a Storage System," and claims the benefit of U.S. provisional patent application No. 60/728,680, filed on Oct. 20, 2005, and entitled "An Innovative Method of Expanding Storage Capacity in a Virtualized Storage System," and U.S. provisional patent application No. 60/728,666, also filed on Oct. 20, 2005, and entitled "Method of Providing Redundancy in a Storage System Through Chained Declustering," each of which are expressly incorporated herein by reference in their entirety.

TECHNICAL FIELD

The disclosure provided herein relates generally to the field of storage systems consisting of multiple storage nodes and, more particularly, to the field of providing redundancy in storage servers.

BACKGROUND

Scalability is an important requirement in all data storage systems. Different types of storage systems provide diverse methods of seamless scalability through capacity expansion. In some storage systems, such as systems utilizing redundant array of inexpensive disk ("RAID") controllers, it is often possible to add disk drives (or other types of mass storage devices) to a storage system while the system is in operation. In such a system, the RAID controller re-stripes existing data onto the new disk and makes the capacity of the other disks available for new input/output ("I/O") operations. This methodology, known as "vertical capacity expansion," is common. However, this methodology has at least one drawback in that it only scales data storage capacity, without improving other performance factors such as the processing power, main memory, or bandwidth of the system.

In other data storage systems, it is possible to add capacity by "virtualization." In this type of system, multiple storage servers are utilized to field I/O operations independently, but are exposed to the initiator of the I/O operation as a single device, called a "storage cluster." Each storage server in a cluster is called a "storage node" or just a "node." When data storage capacity becomes low, a new server may be added as a new node in the data storage system. In addition to contributing increased storage capacity, the new storage node contributes other computing resources to the system, leading to true scalability. This methodology is known as "horizontal capacity expansion." Some storage systems support vertical expansion of individual nodes, as well as horizontal expansion by the addition of storage nodes.

Systems implementing horizontal capacity expansion may choose to concatenate the capacity that is contributed by each node. However, in order to achieve the maximum benefit of horizontal capacity expansion, it is necessary to stripe data across the nodes in much the same way as data is striped across disks in RAID arrays. While striping data across nodes, the data should be stored in a manner that ensures that different I/O operations are fielded by different nodes, thereby utilizing all of the nodes simultaneously. It is also desirable not to split I/O operations between multiple nodes, so that the I/O latency is low. Striping the data in this manner provides a boost to random I/O performance without decreasing sequential I/O performance. The stripe size is calculated with this consideration, and is called the "zone size."

When data is striped across multiple nodes, the process of re-striping data when a new node is added is lengthy and inefficient in most contemporary storage systems. In particular, current storage systems require the movement of a massive amount of data in order to add a new node. As an example, in order to expand a four node cluster to a five node cluster using current data migration methodologies, only one in twenty storage zones (referred to herein as "zones") remains on the same node, and even those zones are in a different physical position on the node. Hence, the current process of migration is effectively a process of reading the entire body of data in the system according to its unexpanded configuration, and then writing it in its entirety according to expanded configuration of the cluster.

Such a migration process typically takes several days. During this time, the performance of the cluster is drastically decreased due to the presence of these extra migration I/O operations. A complicated method of locking is also required to prevent data corruption during the data migration process. The storage capacity and processing resources of the newly added node also do not contribute to the cluster until the entire migration process has completed; if an administrator is expanding the node in order to mitigate an impending capacity crunch, there is a good likelihood that the existing capacity will be depleted before the migration completes. In all cases, the migration process is cumbersome, disruptive and tedious.

It is with respect to these considerations and others that the following disclosure is presented.

SUMMARY

A system, method, apparatus, and computer-readable medium are described for providing redundancy in a data storage system. According to one method, static maps are defined and stored that define stripe patterns for data stored on the storage nodes of a storage cluster. Maps are defined for storage clusters having different numbers of nodes. For instance, maps may be defined for storage clusters having two nodes, three nodes, four nodes, and so on. A storage cluster is striped according to one of the maps corresponding to the number of nodes in the storage cluster. When one or more additional storage nodes are added to the storage cluster, the appropriate map is identified and the data to be moved to the new nodes during re-striping are identified based on the contents of the maps.

According to one aspect provided herein, the maps are defined such that no movement of data occurs during re-striping between two storage nodes that existed in the cluster prior to the addition of the new storage nodes. The maps are also defined such that data stored on each storage node is mirrored on another storage node. In this manner, redundant storage is provided while at the same time minimizing data movement during capacity expansion through the addition of a new node by eliminating all data movement between old nodes. According to other aspects, the maps may be further defined such that when the new storage node is added to the cluster and the cluster is re-striped according to the second map, an equal amount of data is moved to the new storage node from each of the storage nodes that existed in the storage cluster prior to the addition of the new storage node. This method of placing data is valid for both even and odd numbers of nodes, and the set of maps governing this placement is referred to herein as the mirrored Data Placement Algorithm ("m-DPA").

According to other aspects, the data stored on the storage cluster is divided into storage zones. The storage zones are distributed among the storage nodes according to the maps such that each storage zone is present on two different storage nodes. Additionally, one of the storage nodes is designated as the owner of a storage zone and another one of the storage nodes is designated as a peer for the zone. The owner node for a storage zone directly fields I/O operations directed to the storage zone and also causes the I/O operation to be mirrored to the peer node. If an I/O operation is received at a peer node, it is redirected to the owner node for fielding. If an I/O operation is received at a node that is neither the owner nor the peer for the destination storage zone, the I/O operation is redirected to the owner node for processing. In this manner, the implementations described herein tackle data integrity issues for concurrent writes through a system of distributed storage zone ownership among mirrored storage zones.

According to other aspects, the failure or unavailability of a node may be handled without causing I/O failure. In particular, if an I/O operation is received at a peer node that is unable to communicate with the owner node, the peer node will field the I/O operation directly. The peer node will also take over ownership of the node until the owner node becomes available. When the owner node again becomes available, the owner node is rebuilt from the contents of the peer node and ownership of the zone is again assigned to the original owner node. Storage medium failures are handled by reading the data from the peer and rewriting the data to the owner node. According to other aspects, zone ownership assignments are not modified during expansion, thereby simplifying locking.

The above-described aspects may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the embodiments presented herein, will be apparent from a reading of the following detailed description and a review of the associated drawings.

BRIEF DESCRIPTION OF THE DRAWINGS

FIG. 6 illustrates how the ownership of storage zones is maintained following the capacity expansion of a storage cluster;

FIGS. 7A-7D illustrate how I/O operations are redirected to an appropriate owner node, and how link failure and medium errors are handled in one embodiment described herein;

DETAILED DESCRIPTION

Figure 1:
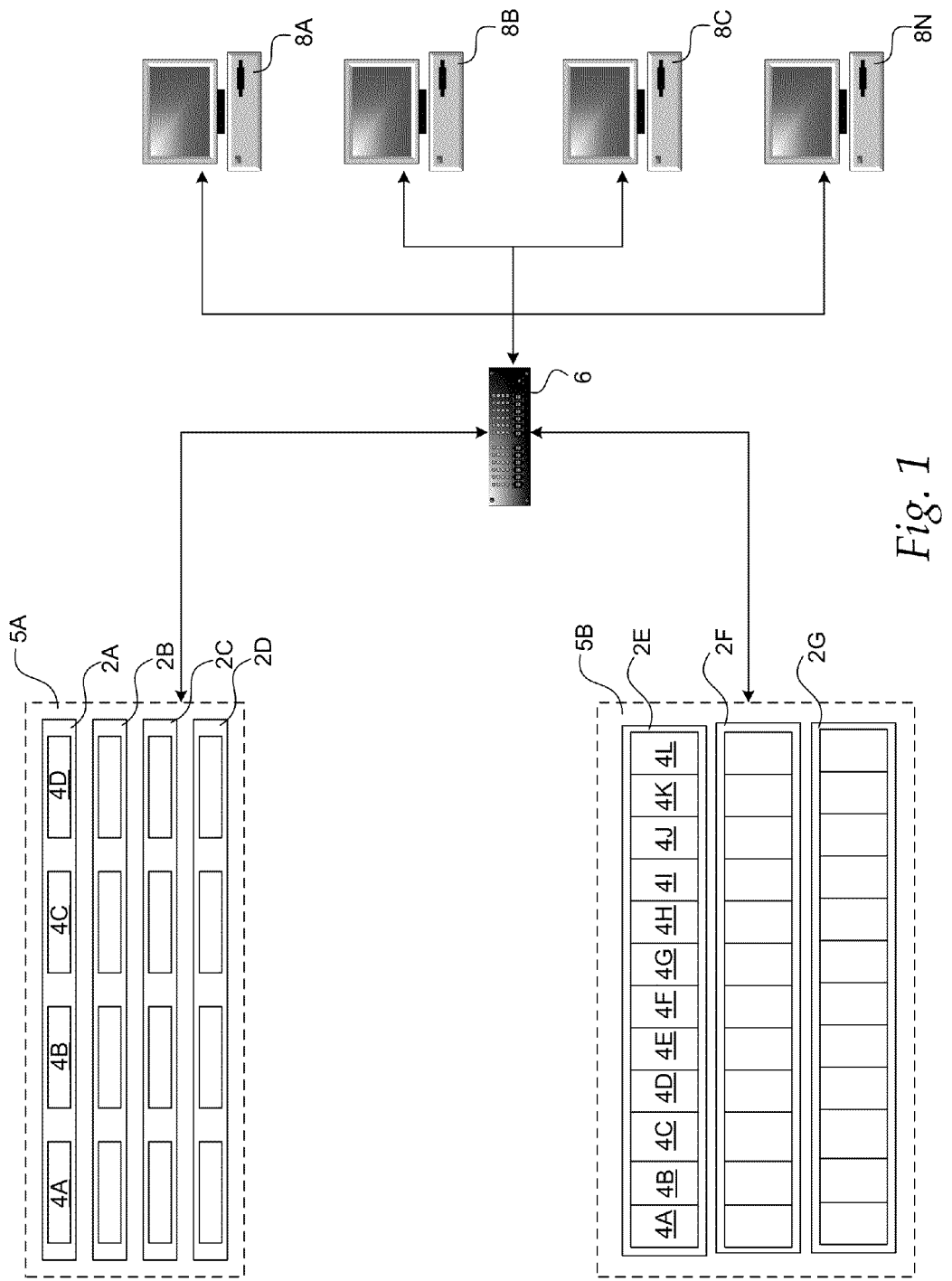
FIG. 1 is a computer architecture and network diagram showing aspects of a computer network and a storage server computer described herein.

In the following detailed description, references are made to the accompanying drawings that form a part hereof, and in which are shown by way of illustration specific embodiments or examples. Referring now to the drawings, in which like numerals represent like elements through the several figures, aspects of an illustrative operating environment will be described.

Figure 2:
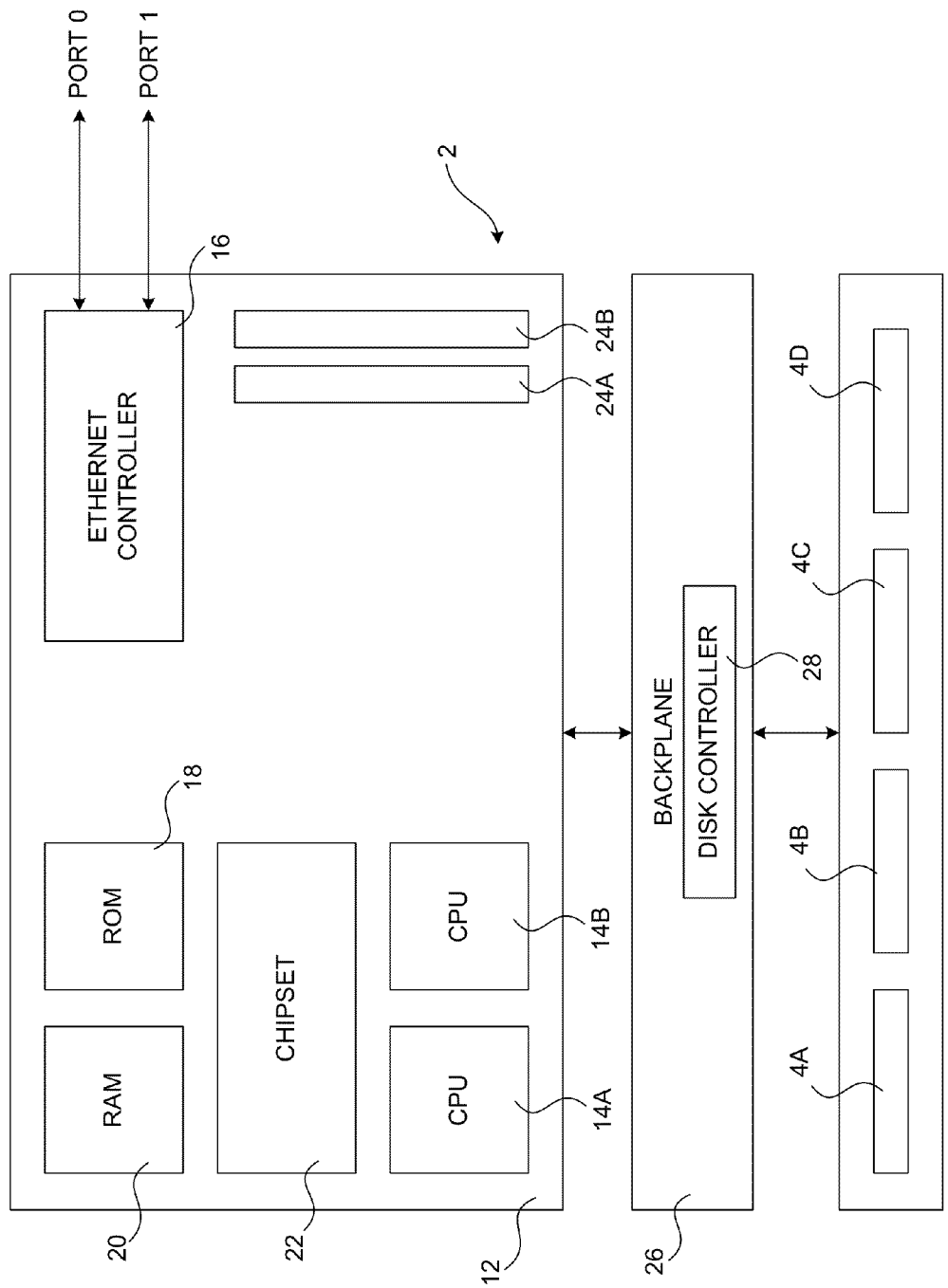
FIG. 2 is a computer architecture diagram illustrating aspects of a storage server computer described herein.
Figure 3:
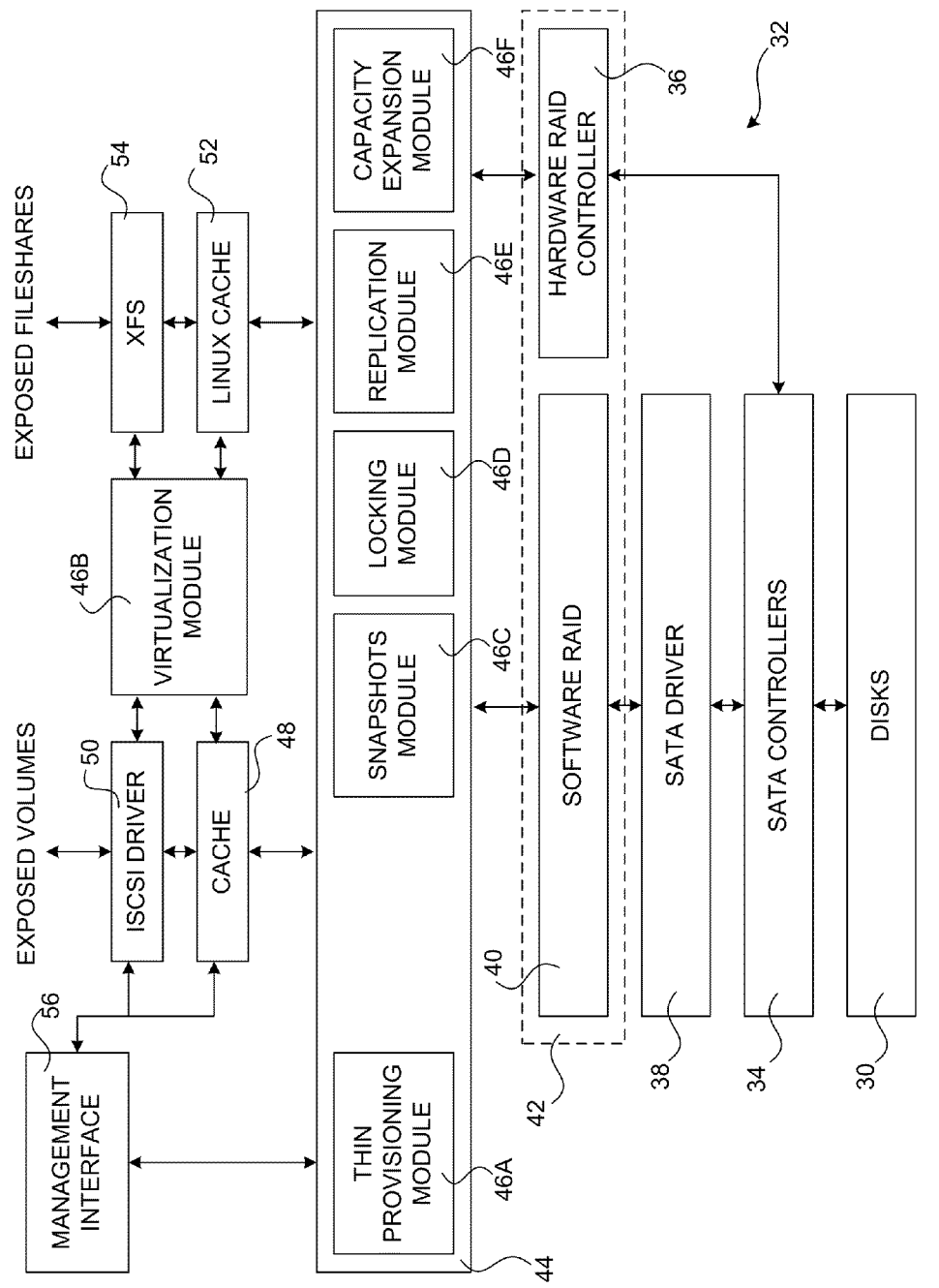
FIG. 3 is a software architecture diagram illustrating various aspects of a storage stack utilized by a storage server described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Referring now to FIG. 1, an illustrative operating environment for the various implementations described herein will be disclosed. As shown in FIG. 1, the embodiments presented herein may be implemented in the storage server computers 2A-2G (also referred to herein as "storage nodes" or a "node") that are operative to read and write data to one or more mass storage devices, such as hard disk drives. According to implementations, the storage server computers 2A-2G may be housed in a one rack space unit storing up to four hard disk drives. For instance, the node 2A includes the hard disk drives 4A-4D. Alternatively, each node may be housed in a three rack space unit storing up to fifteen hard disk drives. For instance, the node 2E includes the hard disk drives 4A-4L. Other types of enclosures may also be utilized that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to an initiator of an I/O operation as a single device. It should be appreciated that a storage cluster may include any number of storage nodes.

When data storage capacity becomes low on a storage cluster, additional capacity may be added to the cluster through the addition of a new storage node to the cluster or by adding additional mass storage devices to an existing storage node in the cluster. As discussed briefly above, the addition of a new storage node to a cluster not only increases the storage capacity of the cluster, but also contributes other computing resources to the system, leading to true scalability. This methodology is known as "horizontal capacity expansion." The implementations described herein are primarily concerned with the addition of storage capacity to a storage cluster through the addition of a new storage node.

In order to achieve the maximum benefit of horizontal capacity expansion, data is striped across the nodes of each storage cluster. For instance, the cluster 5A may stripe data across the storage nodes 2A, 2B, 2C, and 2D. The cluster 5B may stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance. In particular, striping is most commonly done by dividing the storage capacity of each node into storage "zones," and by placing all zones with the same remainder when divided by the number of nodes, into the same node. For example, in a four node cluster such as the cluster 5A, zones 0, 4, 8, 12, 16, etc. are stored in node 0; zones 1, 5, 9, 13, 17 etc. are stored in node 1; zones 2, 6, 10, 14, 18 etc. are stored in node 2; and zones 3, 7, 11, 15, 19 etc. are stored in node 3.

According to embodiments, each storage server computer 2A-2G includes one or more network ports operatively connected to a network switch 6 using appropriate network cabling. It should be appreciated that, according to one implementation disclosed herein, Ethernet or Gigabit Ethernet is utilized. However, it should also be appreciated that other types of suitable physical network connections may be utilized to form a network of which each storage server computer 2A-2G is a part.

The network switch 6 is connected to one or more client computers 8A-8N (also referred to herein as "initiators"). It should be appreciated that other types of networking topologies may be utilized to interconnect the clients and the storage server. It should also be appreciated that the initiators 8A-8N may be connected to the same local area network ("LAN") as the clusters 5A-5B or may be connected to the clusters 5A-5B via a distributed wide area network ("WAN"), such as the Internet. An appropriate protocol, such as the iSCSI or Fiber Channel protocol may be utilized to enable the initiators 8A-8D to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Turning now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various embodiments presented herein will now be described. In particular, FIG. 3 illustrates a storage stack 32 utilized in the embodiments described herein. At the top of the storage stack 32, storage volumes or fileshares are exposed to the initiators 8A-8N. At the bottom of the storage stack 32 are the actual mass storage devices, such as the disks 4A-4D, that are utilized to store the data. The mass storage devices are, in turn, connected to a disk controller, such as a Serial ATA ("SATA") controller 34 or a hardware RAID controller 36. In the case of a SATA controller, a SATA driver 38 may be utilized to access the hardware device. Additionally, a software RAID module 42 may also be utilized to provide RAID services in the absence of a hardware RAID controller 36. A unified RAID management layer 42 may be utilized to simplify the utilization of RAID with either software or hardware implementations.

Above the unified RAID management layer 42 sits a kernel module 44 that implements the functionality described herein. In particular, the kernel module 44 may provide functionality for implementing thin provisioning, virtualization, snapshots, locking, replication, and capacity expansion. These features are implemented by the various modules shown in FIG. 3, some of which are described in greater detail herein. In particular, the thin provisioning module 46A provides functionality for allocating physical capacity to logical volumes on an as-needed basis and for provision tracking. The snapshots module 46C provides functionality for creating, utilizing, and managing point in time snapshots of the contents of logical storage volumes. The replication module 46E provides functionality for replication within the computer 2. The locking module 46D provides functionality for synchronizing input/output operations in a computer system that utilizes snapshots and thin provisioning. The capacity expansion module 46F is a related component to the virtualization module, and provides the functionality described herein for re-striping data across multiple nodes when a new node is added. Additional details regarding the operation of the capacity expansion module 46F are provided below.

Above the kernel module 44, a number of software components are utilized depending upon the access mechanism utilized to access the storage cluster of which the storage server computer 2 is a part. In particular, a Storage Area Network ("SAN") path is provided that utilizes a cache 48 and an iSCSI driver 50. A Network Attached Storage ("NAS") path is also provided that utilizes a LINUX cache 52 and the XFS high-performance journaling file system 54. Volumes are exposed through the SAN path while fileshares are exposed through the NAS path. The virtualization module 46B provides functionality for clustering, governing the manner of zoning data amongst various nodes, and specifying how each I/O operation is routed to the node specified by the stripe maps described herein.

It should be appreciated that the kernel module 44 comprises a LINUX-compatible mass storage device driver in one embodiment. However, although the embodiments presented herein are described as being implemented within a LINUX-compatible device driver, the various aspects presented herein may be implemented at different points within the storage stack and in conjunction with other operating systems. For instance, the aspects presented herein may be implemented with the FREEBSD operating system or with the WINDOWS family of operating systems from MICROSOFT CORPORATION of Redmond, Wash. According to embodiments, a management interface 56 may also be provided for controlling and monitoring the functionality presented herein. The management interface communicates with the various layers through software interfaces to retrieve performance data, provide configuration data, and to perform other functions.

Figure 4A:
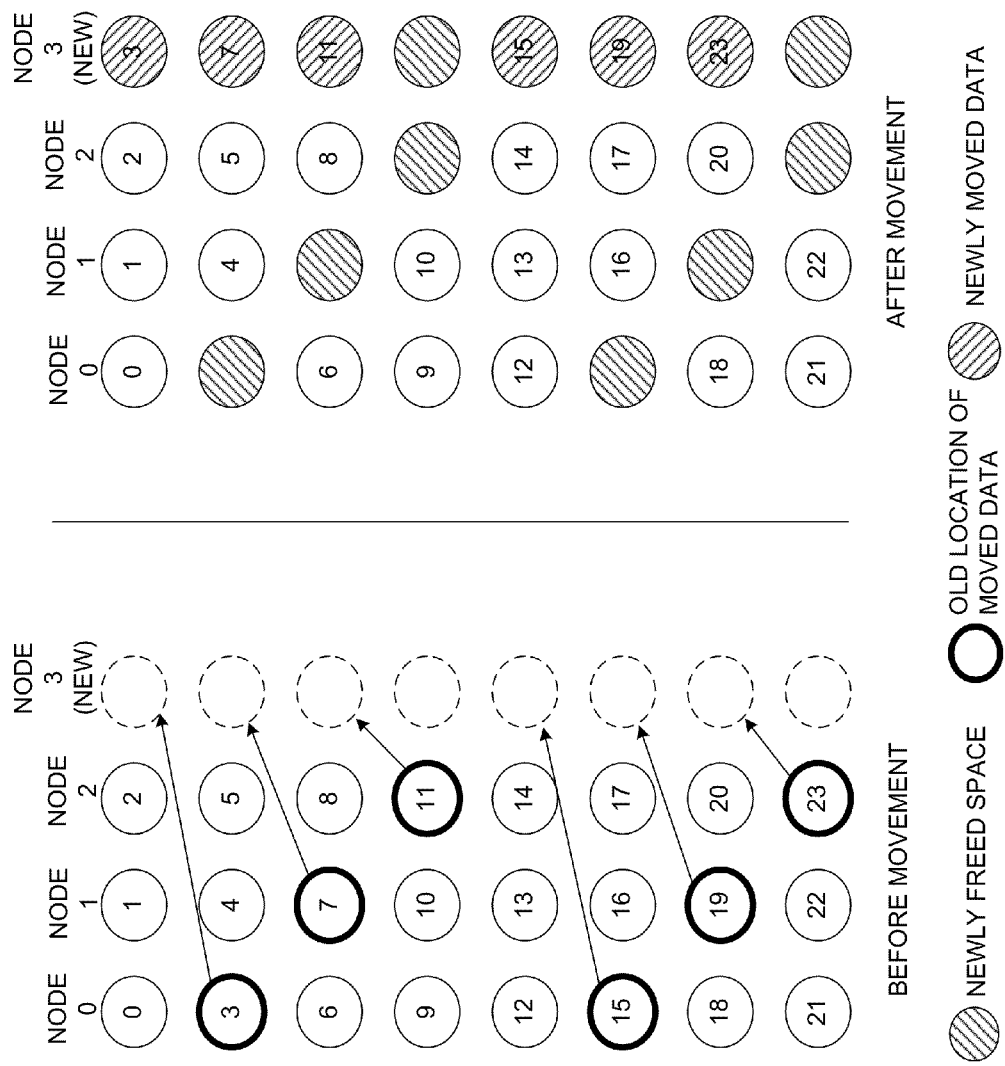
FIGS. 4A-4B show a method of striping data in non-redundant clusters so as to minimize data movement during capacity expansion, and a method of extending this method to chained declustered storage systems.

Referring now to FIG. 4A, an illustrative method for striping data across multiple storage nodes in a cluster will be described. In particular, FIG. 4A shows a method for striping data across multiple storage nodes, wherein maps are generated and stored that define a stripe pattern for storing data on the storage nodes of a storage cluster. Each map corresponds to a cluster having a certain number of nodes. For instance, unique maps may be generated and stored for storage clusters having three nodes, four nodes, five nodes, and so on. An appropriate map is selected based on the number of nodes in the cluster and data is striped on the nodes according to the selected map. When a storage node is added to the cluster, a new map is selected based on the configuration of the cluster after the new storage node has been added. The data on the cluster is then re-striped across all of the storage nodes, including the newly added node, according to the new map.

According to the method illustrated in FIG. 4A, the stripe pattern for each map is defined such that when a storage node is added to a cluster and the data is re-striped according to the new map, only the data that will subsequently reside in the new storage node is moved to the new storage cluster during re-striping. The stripe pattern may be further defined so that during re-striping no movement of data occurs between two storage nodes that existed in the cluster prior to the addition of the new storage node. Additionally, the stripe pattern may be further defined such that during re-striping an equal amount of data is moved from each of the storage nodes that existed in the cluster prior to the addition of the new storage node to the new storage node. These aspects are illustrated in FIG. 4A in that only the zones 3, 7, 11, 15, 19, and 23 need to be moved following the addition of a new storage node to the illustrated cluster. Moreover, no data is moved between the existing nodes (nodes 0-2) and exactly two zones are moved from each node. The method illustrated in FIG. 4A is explained in greater detail in U.S. provisional patent application No. 60/728,680, filed on Oct. 20, 2005, and entitled "An Innovative Method of Expanding Storage Capacity in a Virtualized Storage System," which is expressly incorporated herein by reference.

The method of striping illustrated in FIG. 4A lends itself to very convenient and efficient capacity expansion. It is only necessary to move data from the old nodes to the new node without having to rearrange data within the old nodes. In a thin provisioned storage system, storage space is made available immediately for any I/O operation without decreasing performance significantly. In a non-thin provisioned storage system also, space is available immediately when expansion starts, with data being arranged slightly differently within a node to take advantage of the fact that data is freed in intermediate locations rather than at the end of the storage devices. The maps associated with this method of striping may be referred to as Data Placement Algorithm ("DPA") maps and the method of striping in this manner may be referred to as the DPA. This algorithm, and the corresponding series of maps, forms the basis of the disclosure presented herein. More particularly, the disclosure presented herein deals with the application of the DPA to mirrored storage systems. In a mirrored storage system, the important criterion is that a zone and its mirror should be in different nodes, so that if one node fails, all the data in the zone is safely mirrored on another node. Details regarding this process are provided below.

Figure 4B:
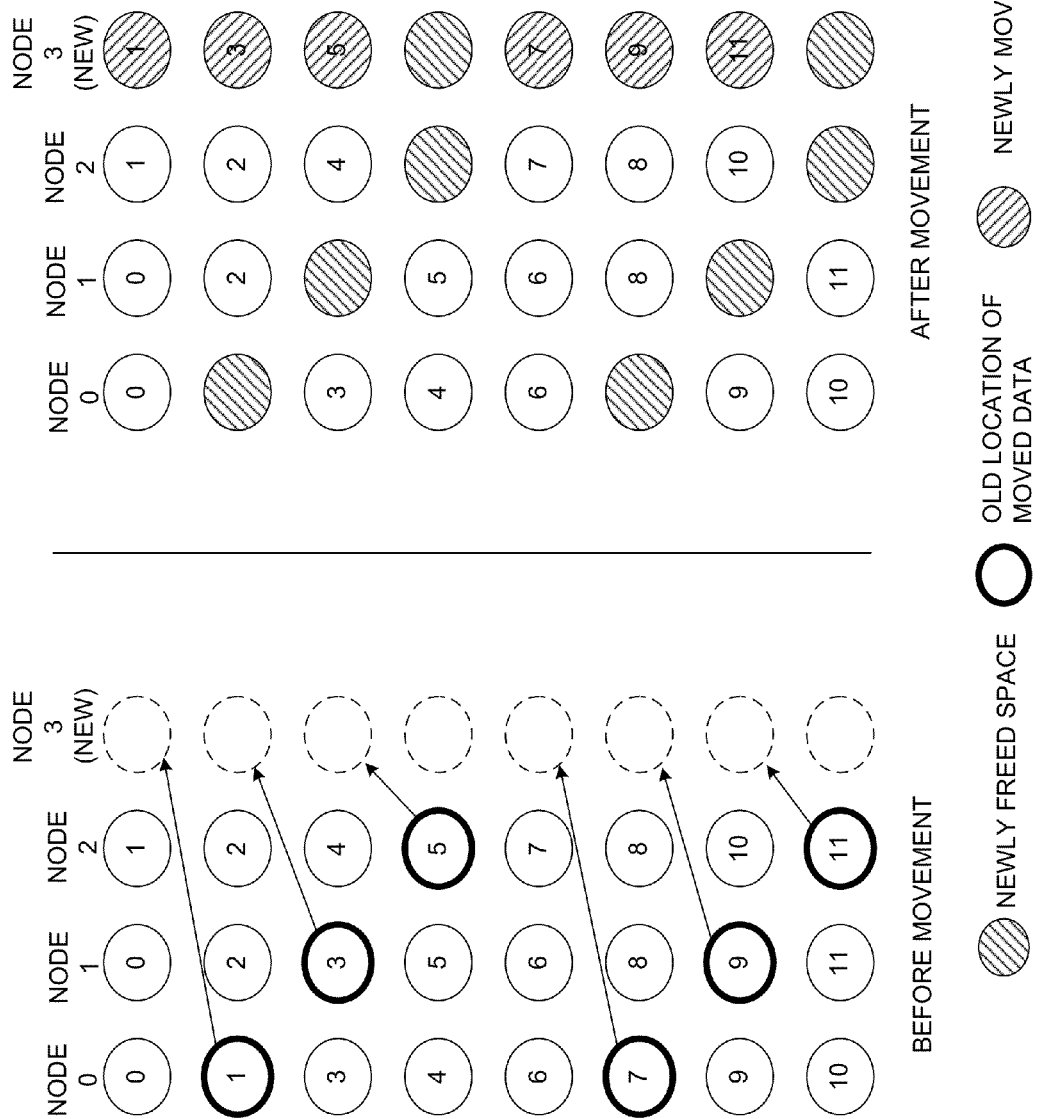

Referring now to FIG. 4B, aspects of a mirrored DPA ("m-DPA") algorithm provided herein will be described. In particular, FIG. 4B illustrates the expansion of a cluster having three nodes that has been striped according to the m-DPA. Utilizing the m-DPA, maps are generated and stored that define a stripe pattern for storing data on the storage nodes of a storage cluster. In each of the stripe patterns, data for each zone is stored on more than one node. For instance, as shown in FIG. 4B, zone 0 is present on nodes 0 and 1, zone 1 is present on nodes 0 and 2, zone 2 is present on nodes 1 and 2, and so on. In this manner, when data is written to a zone it is also written to the mirror of the zone present on another node. Therefore, if any node fails, all of the data contained on the failing node will be present on one or more other nodes.

According to one implementation, m-DPA maps are defined that correspond to clusters having a certain number of nodes. For instance, unique maps may be generated and stored for storage clusters having three nodes, four nodes, five nodes, and so on. An appropriate map is selected based on the number of nodes in the cluster and data is striped on the nodes according to the selected map. When a storage node is added to the cluster, a new m-DPA map is selected based on the configuration of the cluster after the new storage node has been added. The data on the cluster is then re-striped across all of the storage nodes, including the newly added node, according to the new m-DPA map. For example, in the underlying DPA (shown in FIG. 4A), zones 3, 7, 11, 15, 19, and 23 move to the new node from old nodes 0, 1 and 2. In the corresponding m-DPA, therefore, the zones that move are 1, 3 5, 7, 9, and 11 with the mirror that is being moved being the mirror that is stored in the old nodes 0, 1 and 2.

According to one implementation, the location of one zone of each mirrored pair is shown to be the even number obtained by doubling the zone number. The location of the other mirror of the pair is the odd number obtained by adding one to the double of the zone number. For example, the DPA zones 0 and 1 shown in FIG. 4A correspond to the mirrored DPA zone 0 and its mirror in FIG. 4B and the DPA zones 8 and 9 in FIG. 4A correspond to the mirrored DPA zone 4 and its mirror in FIG. 4B.

Utilizing the m-DPA maps described herein to expand the capacity of chained declustered systems shares all the advantages of capacity expansion in non-mirrored DPA systems detailed in U.S. provisional patent application No. 60/728, 680, filed on Oct. 20, 2005, and entitled "An Innovative Method of Expanding Storage Capacity in a Virtualized Storage System." In particular, the stripe pattern for each m-DPA map is defined such that when a storage node is added to a cluster and the data is re-striped according to the new map, only the data that will subsequently reside in the new storage node is moved to the new storage cluster during re-striping. The stripe pattern for each m-DPA map may be further defined so that during re-striping no movement of data occurs between two storage nodes that existed in the cluster prior to the addition of the new storage node. Additionally, the stripe pattern for each m-DPA map may be further defined such that during re-striping an equal amount of data is moved from each of the storage nodes that existed in the cluster prior to the addition of the new storage node to the new storage node.

FIGS. 11A-11D illustrate the m-DPA maps for three to six nodes, respectively. It should be appreciated that m-DPA maps for clusters having additional nodes may also be defined that satisfy the properties described above. It should also be appreciated that the maps illustrated in FIGS. 11A-11D are merely illustrative and that other arrangements of data may be created that satisfy the m-DPA properties described herein.

Figure 5C:
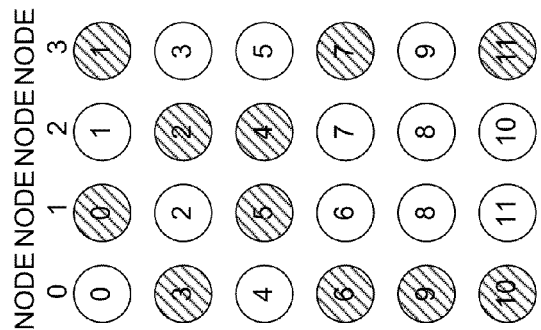
FIGS. 5A-5C illustrate methods of distributing the ownership of storage zones between nodes to eliminate data corruption.
Figure 5B:
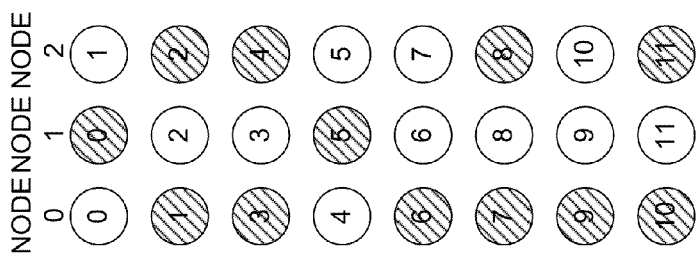
Figure 5A:
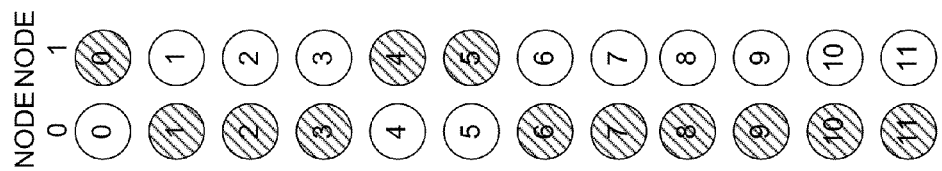

Referring now to FIGS. 5A-5C, aspects of the disclosure presented herein for defining zone ownership will be described. It should be appreciated that chained declustering may present several issues that are not present in normally striped systems. The first of these problems is referred to as the "fielder decision." As described above, each zone is present in two different nodes. When an I/O operation is received for a zone in one of the nodes, the I/O operation mirrored synchronously to the paired node before the I/O is completed to the initiator.

Depending on the hardware and device drivers being used, an indiscriminate fielding of I/O operations by either of the two nodes that host a particular zone may lead to a situation where the data may not be consistent on the two nodes. For example, consider a situation where two threads running in the initiator are writing data to the same sector (or overlapping sector sets) of a particular zone. Assume also that the two threads fire I/O operations to different nodes. In this scenario, each node simultaneously fields the I/O locally as well as sending it to the mirror. These two pairs of operations race on both boxes. While an initiator that sends I/Os in this manner is not guaranteed which of the two I/O operations will reach the disk later (and will therefore be eventually present on it), the initiator does expect that whichever I/O operation has reached the disk last on one mirror will have also reached the disk last on the other mirror. This will make the initiator behave identically regardless of whether it is reading data from one node, or, in the event of a box failure, is reading data from the other node. However, in the absence of a mechanism to ensure this, the assumption of identical mirroring will be invalidated.

One solution to this issue is to lock sectors across both nodes till an I/O has finished. This solution, however, decreases performance while simultaneously requiring more resources in terms of memory and processing power to implement, because the lock needs to be obtained without deadlock on both nodes. Another solution is to assume that all I/O operations to a particular volume are fielded only by a particular node; other volumes are similarly uniquely associated with other nodes. These nodes replicate the I/O operation to the other nodes. This solution would eliminate data integrity issues, but is bad for load balancing. A third solution involves the concept of "zone ownership."

Utilizing zone ownership as described herein, only one of these nodes is designated the "owner" of the zone even though a zone is mirrored on two nodes. The other node is designated the "mirror" or the "peer" of the zone. An I/O operation directed to a particular zone must always be redirected to the owner regardless of the zone where the I/O operation is received. The owner of the zone fields the I/O operation locally, including storing it in its cache, and then fires the I/O operation to the peer node as a replication I/O operation. The peer is permitted to field I/O operations directly only in the event of failure of the owner node.

FIGS. 5A-5C show one possible ownership pattern for two, three and four node clusters respectively. In FIGS. 5A-5C, owner nodes are shown with crosshatching, while peer nodes are shown without crosshatching. For instance, as shown in FIG. 5A, node 1 is the owner for zone 0 while node 0 is the peer for zone 0. Similarly, node 0 is the owner for zone 1 while node 1 is the peer for node 1. In this manner, ownership is distributed among the nodes comprising the storage system on a per-zone basis. It should be appreciated, however, that there is no requirement for distributing ownership. It may be desirable, however, that every node field roughly the same number of I/O operations, so as to get maximum performance benefits during random I/O load. The distribution of ownership may not be equal in the particular subset of zones shown in the FIGURES; however, over a larger zone spread, the distribution is balanced.

It is important to note that though only maps for clusters having two, three, and four nodes have been shown in FIGS. 5A-5C, almost any number of nodes can be supported for chained declustering using the concepts of m-DPA and ownership presented herein. The requirements for an arbitrary number of nodes are generally that: (a) a zone and its mirror do not lie in the same node; and (b) expansion involves only the movement of data to the new node, and not between existing nodes. It should also be appreciated that the maps illustrated in FIGS. 5A-5C are only one illustrative distribution of ownership and that other specific maps may be utilized. Data describing the zones owned by each node may be stored as an overlay to the maps themselves.

Referring now to FIG. 6, an additional property of the m-DPA maps provided herein will be described. In particular, the specific maps illustrated in FIGS. 5A-5C have a great advantage compared to generically distributed maps. The advantage of these maps is that in this particular configuration of data and ownership, the defined ownership for each zone does not change when capacity is expanded. This is illustrated in FIG. 6.

In the example shown in FIG. 6, a three node cluster is being expanded to four nodes. In this example, ownership has been distributed among the nodes. Owner nodes are shown with crosshatching while peer nodes are shown without. The zones moved during expansion are zones 1, 3, 5, 7, 9, and 11. Zone 1 is an owner node, zone 3 is a peer node, zone 5 is a peer node, zone 7 is an owner node, zone 9 is a peer node, and zone 11 is an owner node. During movement, the ownership assigned to each of these zones is not modified. Accordingly, when the zones are moved to the new node (node 3), the ownership assignments remain the same for each zone. The consequences of this are extremely beneficial in simplifying the expansion logic. In particular, because of this property a distributed lock is not required between the owner and the peer during expansion as would have been necessary had there been owner-peer transitions during this period. While expansion is proceeding, it is only required to lock the mirror of the zone that is being transferred; if this is the owner, I/O operations will be locked before being fielded locally or replicated; and if this is the peer, I/O operations will be locked during replication. Additionally, link failure handling is also simpler due to this property of certain m-DPA maps. Handling of link failures will be described in greater detail below with reference to FIGS. 7A-7D.

It should be appreciated that in one embodiment, the storage devices that are underlying the region of the storage stack may not guarantee sequential completion of I/O operations even when the higher layers are well-behaved. For example, depending on the device driver and operating system for disk drives in the storage system, simultaneous I/O operations to the same sector may arrive either in order or out of order. When the I/O dynamics are such, the issue of data coherence does not arise because it cannot be guaranteed by at least one component of the chain of algorithms between the initiator and the physical disk. In such a situation, the implementations described herein may be deployed without necessarily having the concept of ownership, and either of two mirrored nodes may be allowed to field I/O operations without locking Nonetheless, for operations such as rebuild or expansion, there will need to be a form of locking implemented in order to prevent data integrity issues during these operations due to write-after-write operations.

FIGS. 7A-7D show how I/O operations are fielded in one embodiment presented herein. In particular, when an I/O operation arrives at any node, it is forwarded to the owner of the zone to which the I/O operation is directed so that it may be fielded directly by the owner. In FIG. 7A, for example, a write I/O operation for zone 0 arrives accidentally at the peer (node 0) from an initiator at operation 702. Node 0 does not field the I/O operation, however. Instead, node 0 redirects the I/O operation to node 1, which is the owner at operation 704. Node 1 then fields the I/O operation locally and mirrors it back to node 0 at operation 706. After the I/O operation has been successfully written to both the peer and the owner, its completion is acknowledged back to the initiator through the node that first fielded it from the initiator (in this case, node 0). This occurs at operations 708 and 710.

FIG. 7B illustrates the processing that is performed if the node that owns the zone (node 1 in this case) has failed. In this example, a write I/O operation is received at node 0 at operation 712. An attempt is made to forward the I/O operation to the owner node (node 1) at operation 714. However, because node 1 has failed, the I/O hop from 0 to 1 will be unsuccessful, and the hop I/O will be acknowledged with an error at operation 716 or may time out. When this occurs, the node 0 cannot unilaterally decide that node 1 has failed; it is equally likely that node 0 may also have failed. If each box is allowed to make a decision unilaterally, the cluster will soon degenerate into multiple islands (into a "split-brain" configuration).

In order to avoid the split brain configuration, the node 0, on receiving a failure from node 1, contacts another node in the cluster to make sure node 0 itself is not disconnected. This occurs at operation 718. Node 0 may contact any arbitrary node in the cluster; however, as a simplification, we assume the presence of a node that is designated the "master" in the cluster. The master has the task of arbitrating in such situations to decide which of the nodes should be deemed as having failed. The master may do this either by testing the connection with each of the two nodes that are contending, or alternately, the ability of a node to reach the master may itself be taken as its guarantee of being active. The latter assumption is typically more efficient and works well in simpler network configurations; the former method may be required for a more complicated network configuration that has multiple methods of failure.

The process of breaking a tie through a master is not possible in a two-node cluster, however. In such a configuration, another innovative method is employed to determine which of the nodes has failed. When this happens, the initiator is treated as the master. If it is possible for the node 0 (in the example) to reach the initiator again, it may be assumed that node 1 has failed. In case of a split brain, where each node is able to communicate with the initiator but is unable to communicate with the other node, the initiator or the master utilizes SCSI reset/release primitives to arbitrate between the two. The initiator may be said to provide a "quorum" to break the tie in this case.

In the example shown in FIG. 7B, if node 0 decides that node 1 is not alive, utilizing one of the above methods, it will now field the I/O at the peer, which in this case is node 0 itself. Node 0 also remembers that node 1 is down, and in response thereto puts itself in a special state so as to rebuild node 1 when it comes back up again. The act of rebuild may be by any method that is suitable and effective for the system. The I/O operation is completed to the initiator at operation 720.

FIGS. 7C and 7D show the general case where the node to which the I/O operation arrives is neither the owner nor the peer for the destination of the I/O. In particular, in FIG. 7C, an I/O operation intended for zone 2 is received at node 0 at operation 722. In response thereto, the I/O operation is forwarded to the owner of zone 2 on node 2 at operation 724. The I/O operation is completed on node 2 and mirrored to the peer on node 1 at operation 726. The I/O operation is then completed to node 0 at operation 728 and completed to the initiator at operation 730.

In FIG. 7D, an I/O operation intended for zone 2 is received at node 0 at operation 732. An attempt is made at operation 734 to forward the I/O operation to the owner of zone 2 on node 2. If no response is received from node 2, node 0 attempts to contact the master node at operation 736. If the master node determines that node 2 has failed, the I/O operation is redirected toward the peer node for zone 2 on node 1. This occurs at operation 738. The I/O operation is then performed on node 1 and completed to node 0 at operation 740. The I/O operation is completed to the initiator at operation 742. Additional details regarding the processes illustrated in FIGS. 7A-7D will be provided below with respect to FIG. 13.

Figure 8:
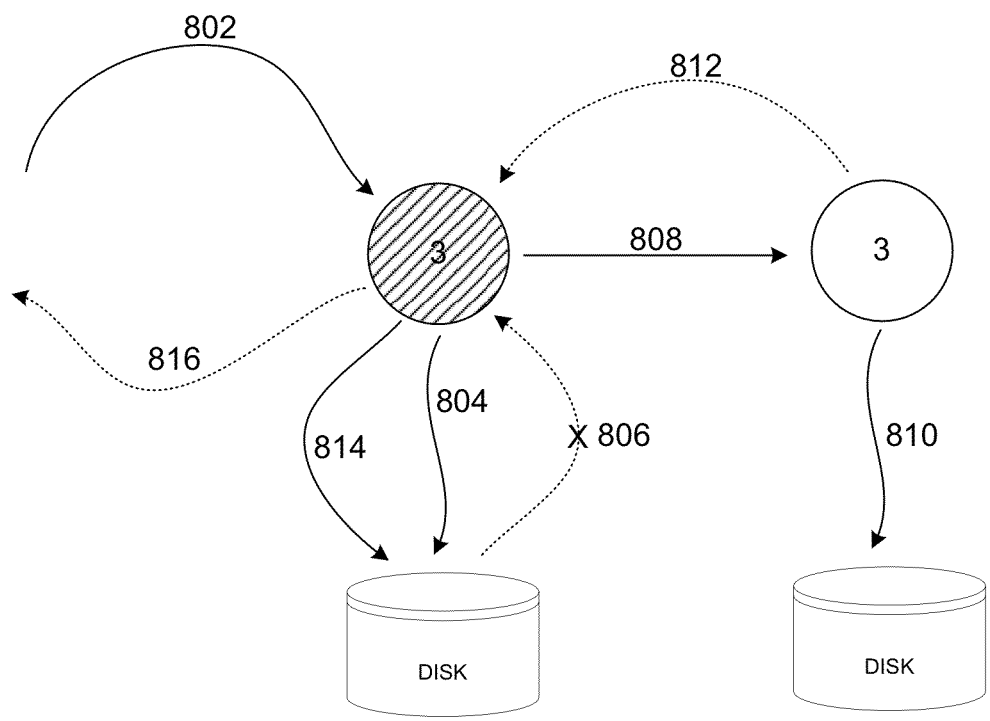
FIG. 8 shows how a node failure is handled, and how the node is rebuilt when it rejoins the system or when it is replaced with a new node according to one implementation described herein.

FIG. 8 demonstrates an implementation wherein the algorithm described above with respect to FIGS. 7A-7D may be utilized to compensate for medium errors in the node fielding the I/O operation. In particular, in this implementation, a medium error is fixed by reading the data from the mirror and writing the data again to the same location; if the underlying mass storage device supports bad block recovery, it will reassign a different block to the sector and mark the original one as bad. In this case, if a medium error occurs while reading from the owner, the owner performs a read from the peer. In addition to returning the read data to the initiator, however, the owner also performs a local write. This fixes the medium error on the underlying disks in the owner also.

In the example shown in FIG. 8, an I/O operation is fielded by the owner of zone 3 at operation 802. At operation 804, an attempt is made to access the disk at operation 804. If a medium error occurs, an error will be returned at operation 806. In response to such an error, the I/O operation is forwarded to the peer for zone 3 at operation 808. The I/O operation is then completed at the peer at operation 810 and returned to the owner node at operation 812. The owner node then performs a local write at operation 814. This fixes the error by writing the correct data in another location on the disk. The I/O operation is then completed to the initiator at operation 816.

Figure 9A:
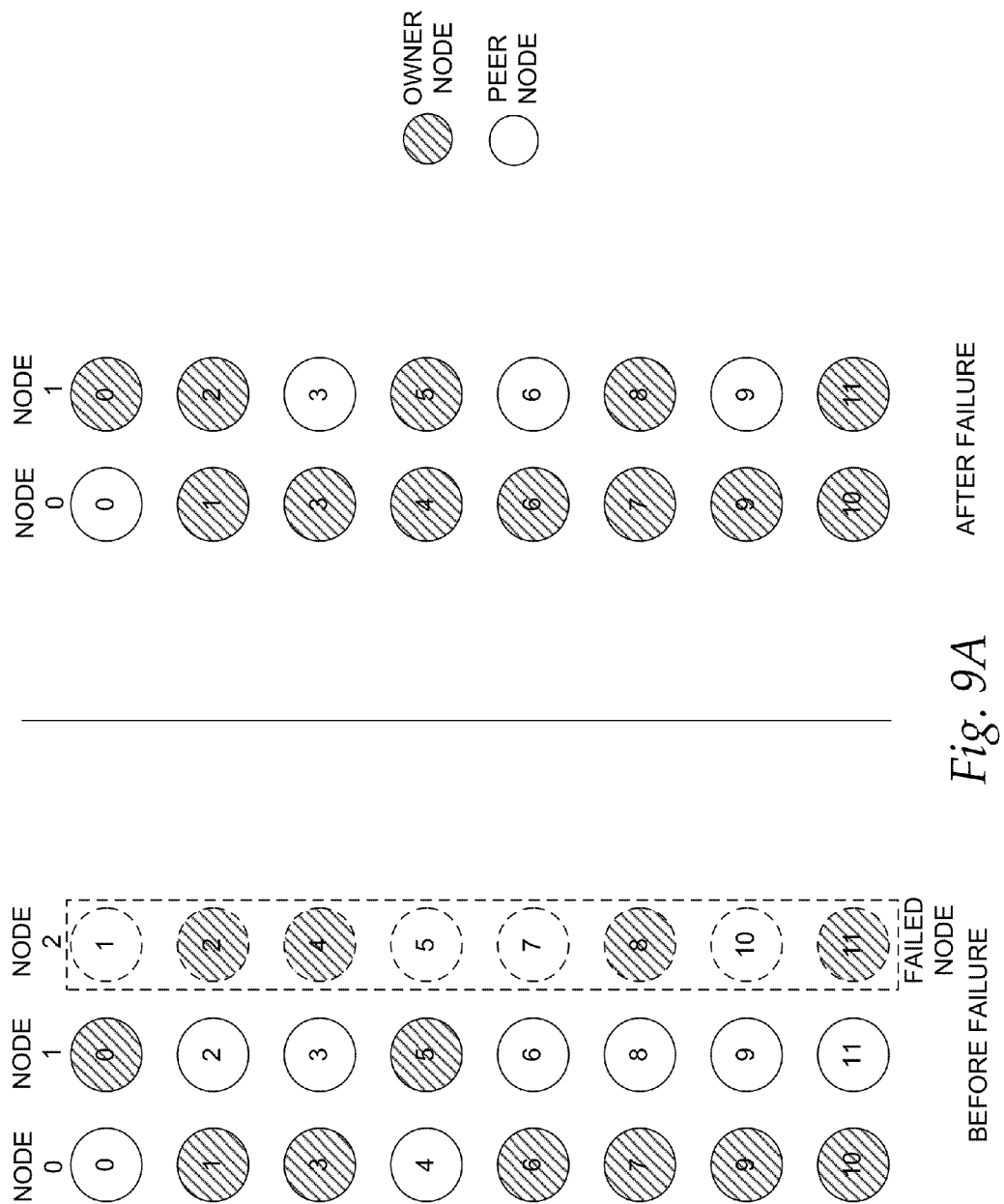
FIG. 9A illustrates how storage zone ownership is reassigned to a peer node in the event of the failure of a storage node.

FIG. 9A illustrates how ownership assignments are taken over by the peer in case of a node failure. In particular, in the example shown in FIG. 9A, the third node (node 2) has failed. Accordingly, the ownership of zones that are in the failed node is reassigned to the peers located in the two remaining nodes. These two nodes also maintain information to keep track of what data has to be rebuilt when the node comes back up again. For instance, prior to the failure, node 2 was the owner node for zones 2, 4, 8, and 11. Following the failure, node 1 is the owner for zones 2, 8, and 11, and node 0 is the owner for zone 4.

Figure 9B:
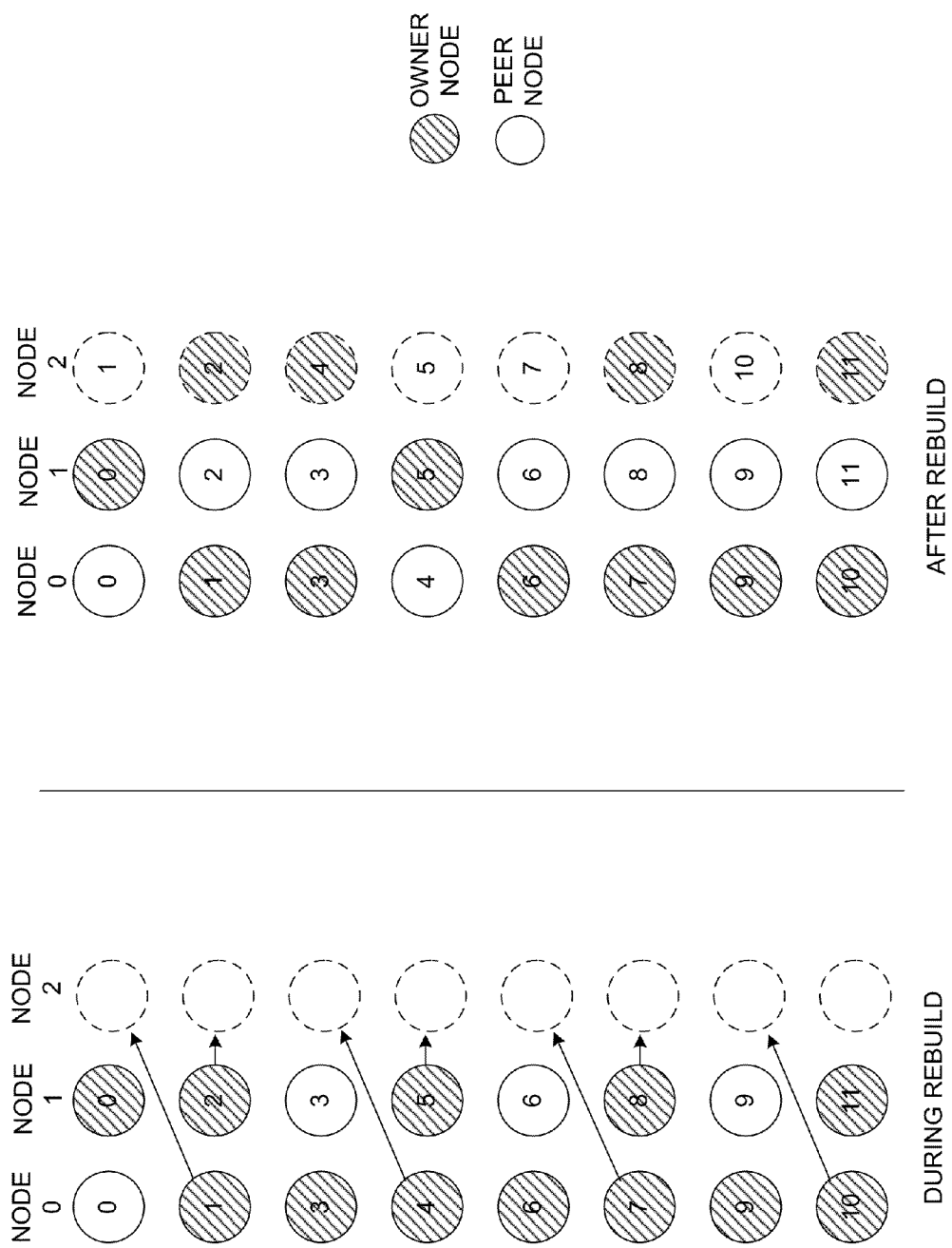
FIG. 9B illustrates one process for rebuilding a storage node when it returns to service following a failure.

FIG. 9B illustrates the process of rebuilding the ownership assignments for node 2 when it comes up again. When a rebuild is initiated, the cluster immediately assumes that the rejoining node has been fully rebuilt, but has an "exception set" that specifies the set of zones which have not yet been rebuilt. This exception set will shrink as resynchronization progresses. The exception set may be implemented via a watermark, or a bitmap, or any other method that is suitable for the system. In this manner, the rebuild process returns the ownership assignments to their original states prior to the node failure.

Figure 10:
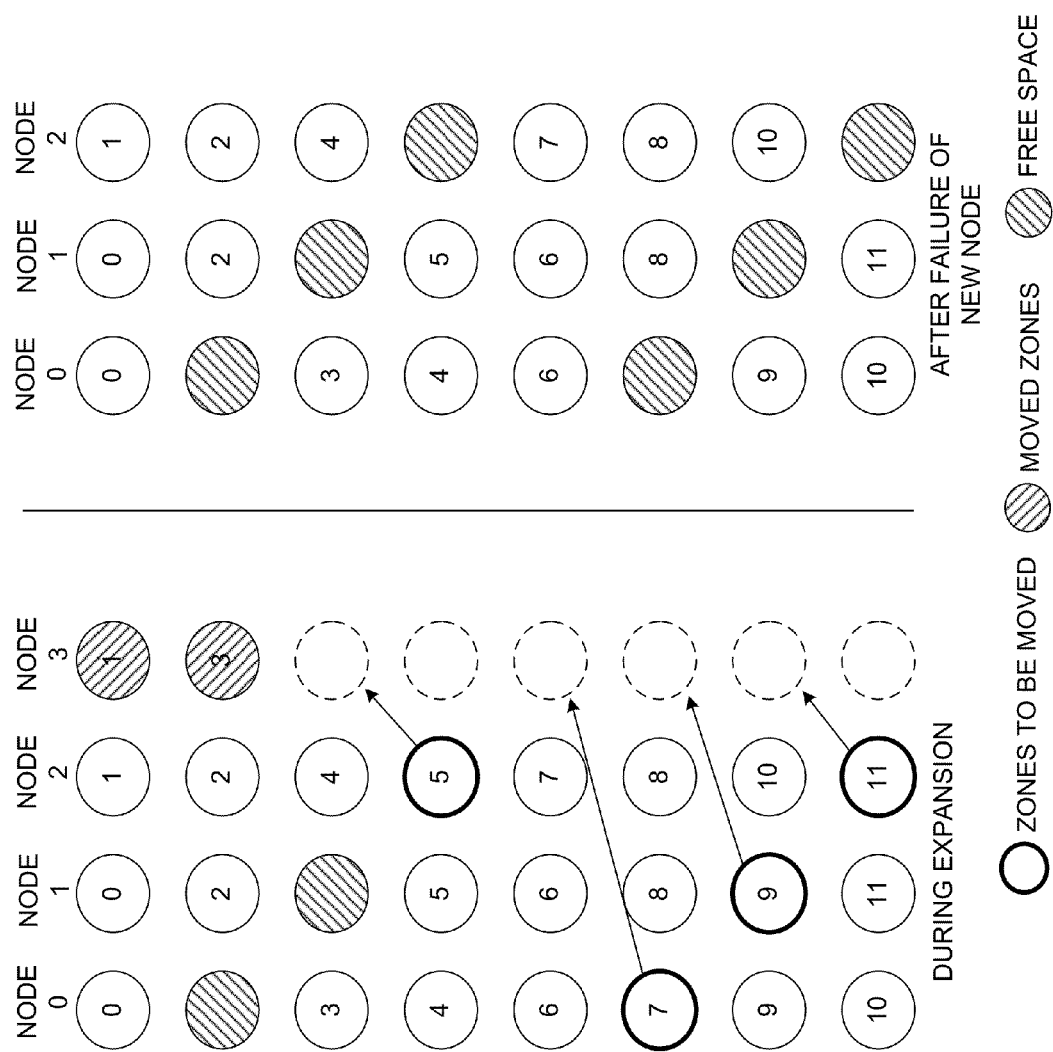
FIG. 10 shows how node failure during capacity expansion is handled in one implementation described herein.
Figure 11A:
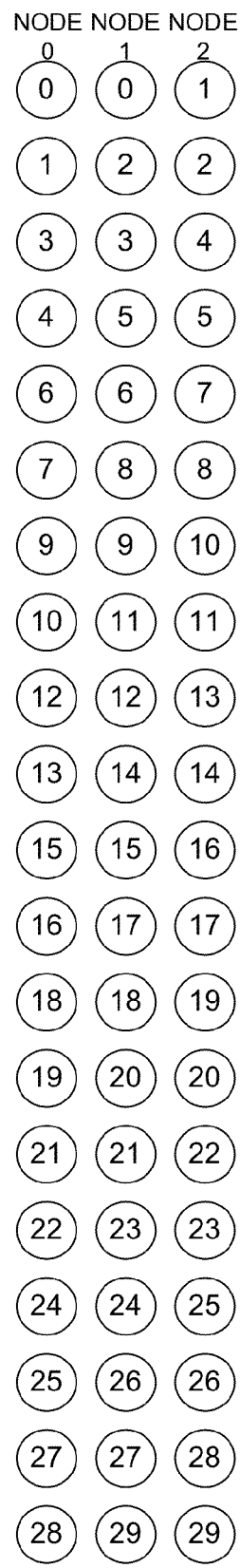
FIGS. 11A-11D show illustrative mirrored DPA tables for three to six nodes.
Figure 11B:
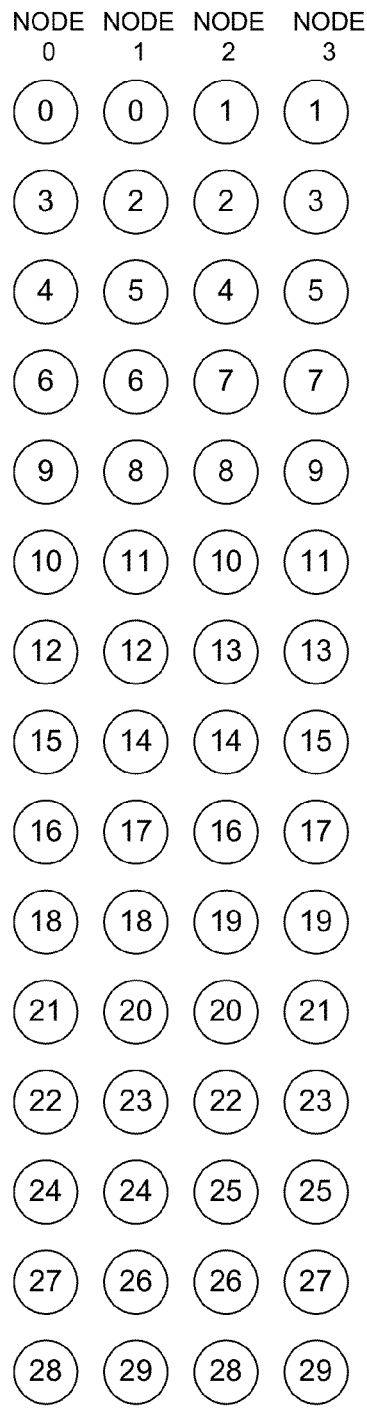
Figure 11C:
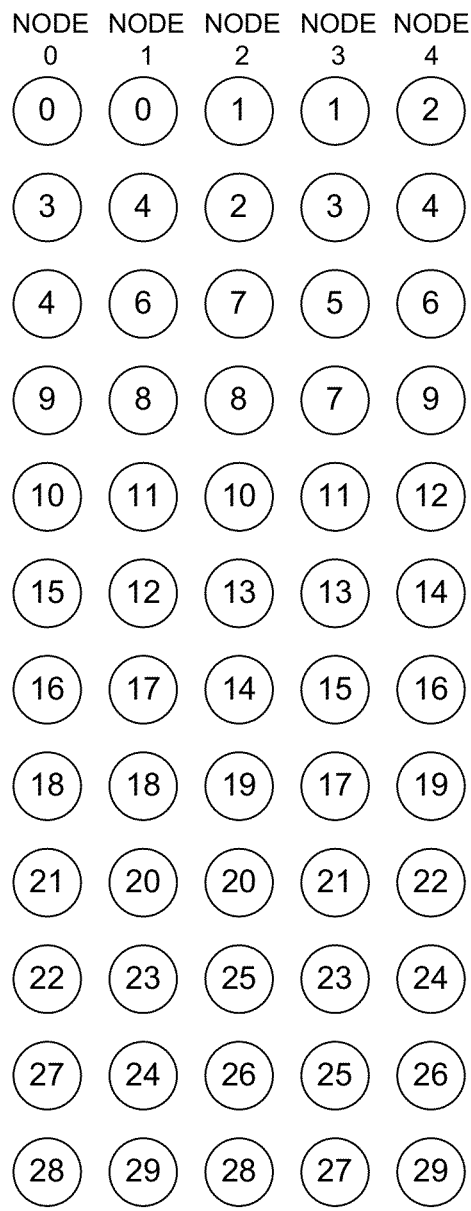
Figure 11D:
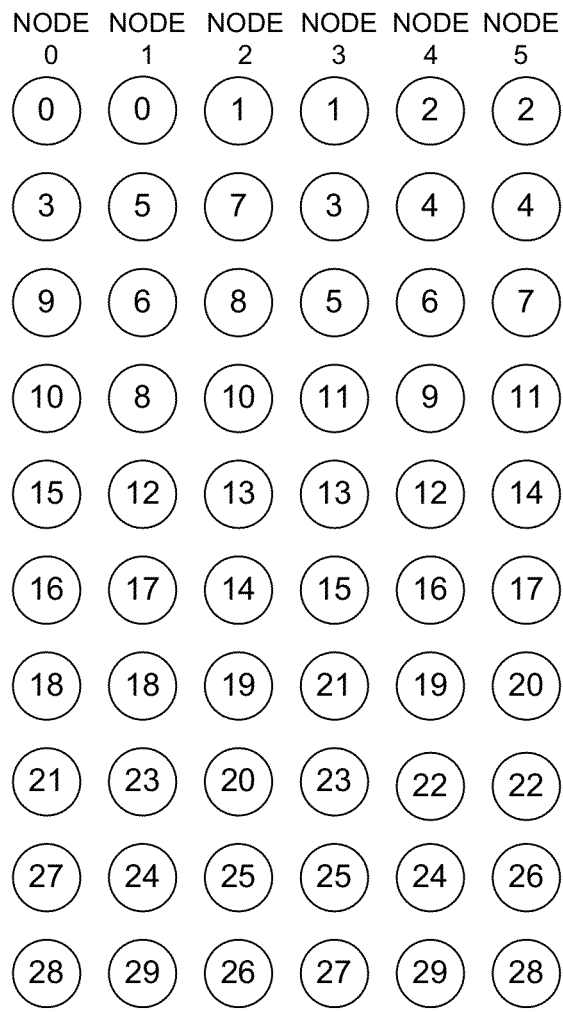

FIG. 10 illustrates aspects of the disclosure presented herein for handling node failures during capacity expansion in an efficient manner. In particular, in the example shown in FIG. 10, a newly added node fails during capacity expansion (failure occurs just following the migration of zone 3 to the new node 3). In this case, failure actually simplifies the process of expansion. Because the failure must be dealt with as a rebuild operation later in any case, the cluster takes advantage of this to "complete" the expansion by freeing all zones that were to have been expanded, and switching to the new map entirely. The mirrors of all zones that were to have been transferred to the new node are notified that they must switch to rebuild mode to handle the presence of a failed node, as described in the preceding paragraph. In this way, capacity is immediately made available to the cluster even though the expanding node has failed.

If an old node fails during expansion, the cluster assumes that the old node will be rebuilt without having to complete the expansion by itself when it rejoins the cluster. The peer zones of all zones that the old node was to have expanded now take up the expansion operation upon themselves. The information about which zones have been transferred and which zones have not yet been transferred by the failing node to the new node may be obtained from the new node.

An important question that is pertinent at this point is how medium error types of failures are handled during resynchronization. Usually, medium errors would cause the resynchronization to fail, since non-redundant data has become unreadable. In one implementation, the volume is not failed as a whole; instead, a bad blocks table is maintained that notes that there is a medium error on the sector that cannot be read. A subsequent write will fix the medium error; intervening reads will continue to return medium error to the initiator.

In the context of chained declustering as a means to implement redundancy, one implementation supports another more conventional method of redundancy, known as multi-site redundancy. This method is only applicable to situations where there is an even number of nodes. In this method, each node is exactly mirrored onto another node. This represents a special case of m-DPA, and may be used in campus networks etc. to protect against geographical disasters. It should also be appreciated that both striped and mirrored volumes in the same storage system may be supported using a DPA-type architecture coupled with a thin-provisioned scheme.

Figure 12:
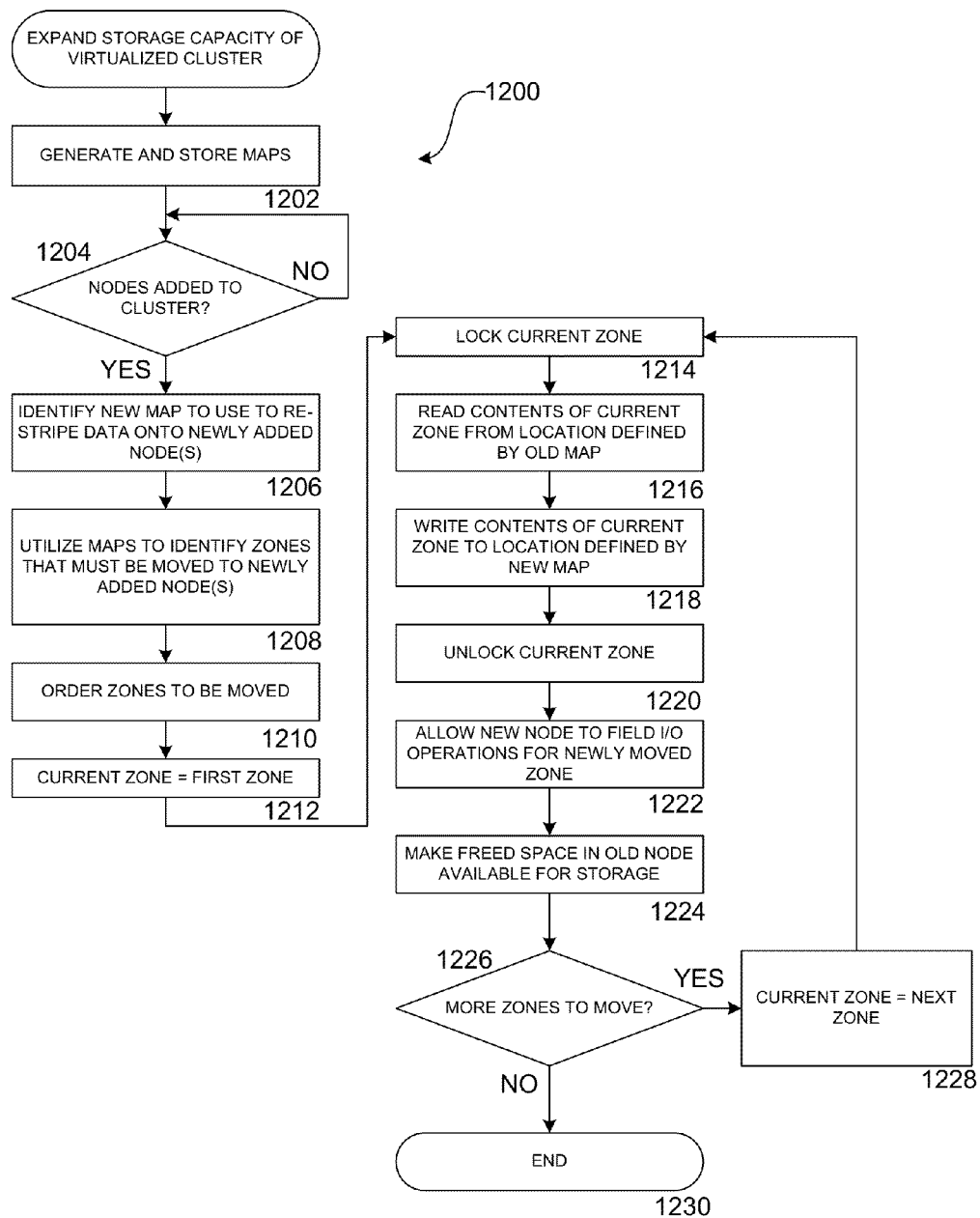
FIG. 12 is a flow diagram showing aspects of an illustrative method for expanding the capacity of a storage cluster.

Referring now to FIG. 12, an illustrative routine 1200 will be described for expanding the capacity of a virtualized storage cluster. It should be appreciated that the logical operations of the various embodiments presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the embodiments described herein. Accordingly, the logical operations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 1200 begins at operation 1202, where the maps that define the striping patterns for the various configurations of a cluster are generated and stored. As discussed above, these maps may be generated using the m-DPA algorithm, such as the maps illustrated in FIGS. 11A-11D. Once the maps have been generated, the routine 1200 continues to operation 1204, where a determination is made as to whether nodes have been added to the cluster. If nodes have been added, the routine 1200 continues from operation 1204 to operation 1206.

At operation 1206, the appropriate map for use with the configuration of the cluster after the new node or nodes has been added is identified. As discussed above, the map is identified based on the number of nodes in the cluster after expansion. Once the appropriate map has been identified, the routine 1200 continues to operation 1208, where the new map and the map that was utilized to stripe the cluster prior to expansion are utilized to identify the zones that must be moved to the newly added nodes. Once the zones to be moved have been identified, the routine 1200 continues to operation 1210, where the identified zones are ordered for movement. The order of movement may be based upon the logical order of the zones, the physical order of the zones, or the order in which the zones were last accessed.

From 1210, the routine 1200 continues to operation 1212 where the value of a variable for storing the current zone is set equal to the first zone in the list of zones to be moved. From operation 1212, the routine 1200 continues to operation 1214, where the current zone is locked. It is only necessary to lock one zone at a time. Once the zone has been locked, the routine 1200 continues to operation 1216, where the contents of the current zone are read from the location on the defined by the old map. Once the data has been read, the routine 1200 continues to operation 1218, where the data is written to the zone defined by the new map. Once the data has been written, the current zone is unlocked at operation 1220. Moreover, at operation 1222, the new node is permitted to immediately begin fielding I/O operations for the newly moved zone.

From operation 1222, the routine 1200 continues to operation 1224, where the space freed as a result of the movement of the current zone is made available for storage. From operation 1224, the routine 1200 then continues to operation 1226, where a determination is made as to whether additional zones remain to be moved. If so, the routine 1200 branches from operation 1226 to operation 1228, where the current zone is set equal to the next zone to be moved. From operation 1228, the routine 1200 branches back to operation 1214, described above. If no additional zones remain to be moved, the routine 1200 continues from operation 1226 to operation 1230, where processing ends. It should be appreciate that, as discussed above with respect to FIG. 6, the ownership designation for each storage zone is maintained during the expansion process illustrated in FIG. 12. In this manner, the ownership of a zone migrates with a zone if it is moved to a new storage node.

Figure 13:
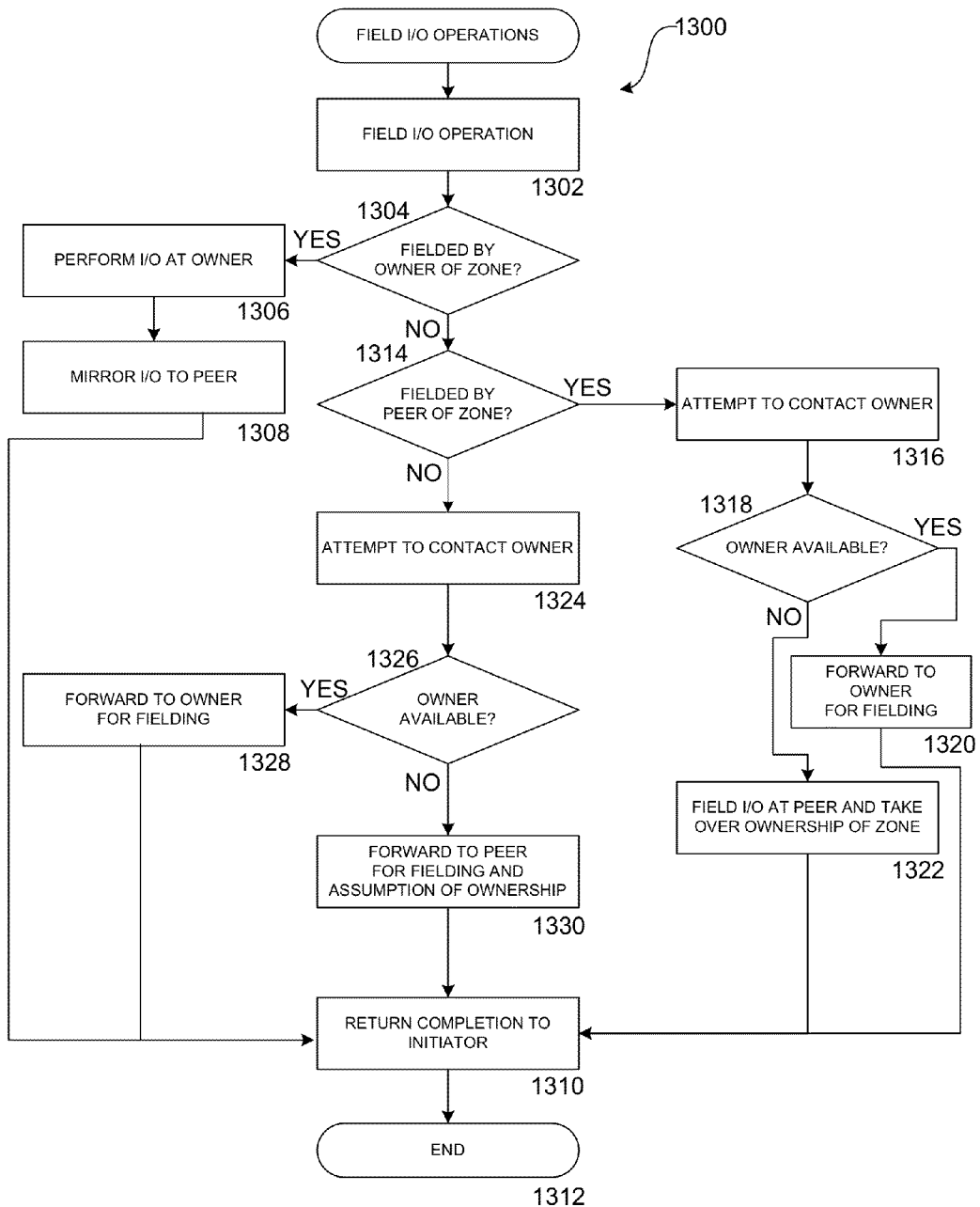
FIG. 13 is a flow diagram showing an illustrative routine for fielding I/O operations according to one implementation provided herein.

Turning now to FIG. 13, an illustrative routine 1300 will be described showing how I/O operations are fielded by storage nodes within a storage cluster according to one implementation. In particular, the routine 1300 begins at operation 1302, where an I/O operation is received at one of the nodes of the storage cluster. The routine 1300 then continues to operation 1304, where a determination is made as to whether the node that received the I/O operation has been designated as the owner of the storage zone to which the I/O operation is directed. If the node that received the I/O is the owner, then the routine 1300 branches to operation 1306. At operation 1306, the requested I/O operation is performed at the owner. The routine 1300 then continues from operation 1306 to operation 1308, where the owner node mirrors the I/O operation to the peer node for the destination storage zone. From operation 1308, the routine 1300 continues to operation 1310 where completion is returned to the initiator of the I/O operation. From operation 1310, the routine 1300 continues to operation 1312, where it ends.

If, at operation 1304, it is determined that the node that received the I/O operation is not the owner of the storage zone to which the I/O operation is directed, the routine continues from operation 1304 to operation 1314. A determination is made at operation 1314 as to whether the node that received the I/O operation has been designated as the peer for the storage zone to which the I/O operation is directed. If so, the routine 1300 branches from operation 1314 to operation 1316, where the peer node attempts to contact the owner node. The routine 1300 then continues to operation 1318, where a determination is made as to whether the peer was able to successfully contact the owner node. As described above a master node may be contacted to confirm that the owner node has failed or is otherwise unavailable. If the owner node is unavailable, the routine 1300 continues from operation 1318 to operation 1322 where the I/O operation is fielded by the peer node. Because the owner node is unavailable, the peer node also assumes ownership for the zone. When the owner node becomes available, the owner node will be rebuilt from the peer node and ownership will be returned to the owner. If the owner is available at operation 1318, the routine 1300 continues to operation 1320, where the I/O operation is forwarded to the owner node for processing. From operations 1320 and 1322, the routine 1300 continues to operation 1310, described above.

If the I/O operation is received by a node other than the owner or peer nodes, the routine 1300 continues from operation 1314 to operation 1324. At operation 1324 an attempt is made to contact the owner node. If the owner node can be reached, the routine 1300 branches to operation 1328 where the I/O operation is forwarded to the owner node for fielding and for mirroring to the peer node. If the owner node cannot be reached, the routine 1300 continues from operation 1326 to operation 1330 where the I/O operation is forwarded to the peer node for fielding and assumption of ownership. From operations 1328 and 1330, the routine 1300 continues to operation 1310, described above.

Although the embodiments presented herein have been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for expanding the storage capacity of a storage cluster comprising two or more storage computers, the method comprising:
    generating a plurality of pre-defined maps;
    storing the plurality of pre-defined maps, each pre-defined map defining a stripe pattern for storing data on a storage cluster consisting of a specific number of storage computers, wherein the storage capacity of the storage cluster is divided into storage zones, the stripe pattern for each pre-defined map is further defined such that each storage zone is stored on at least two storage computers in the storage cluster, and the stripe pattern for each pre-defined map designates for each storage zone a same one of the at least two storage computers as an owner of the storage zone and the others of the at least two storage computers as peers for the storage zone;
    striping data across the storage computers of the storage cluster according to a first map from the plurality of pre-defined maps defining a stripe pattern for storing data on a storage cluster consisting of N storage computers;
    adding a new storage computer to the storage cluster; and
    in response to the addition of the new storage computer to the storage cluster, re-striping the data across the storage computers according to a second map from the plurality of pre-defined maps defining a stripe pattern for storing data on a storage cluster consisting of N+1 storage computers, wherein the stripe patterns of the first map and the second map are defined such that, during re-striping, movement of data never occurs between two storage computers that existed in the storage cluster prior to the addition of the new storage computer, regardless of the number of storage computers that exist in the storage cluster, and wherein the plurality of pre-defined maps are generated and stored before the new storage computer is added to the storage cluster.

2. The method of claim 1, wherein the stripe pattern for each of the plurality of pre-defined maps is further defined such that only the data that will subsequently reside in the new storage computer is moved to the new storage computer during re-striping.

3. The method of claim 2, wherein the stripe pattern for each of the plurality of pre-defined maps is further defined such that when the new storage computer is added to the storage cluster and the storage cluster is re-striped according to the second map, an equal amount of data is moved to the new storage computer from each of the storage computers that existed in the storage cluster prior to the addition of the new storage computer.

4. The method of claim 3, wherein re-striping the data across the storage computers according to the second map comprises:
    identifying one or more storage zones to be moved to the new storage computer based on the first and second maps; and
    individually moving each of the identified storage zones to the new storage computer.

5. The method of claim 1, further comprising:
    in response to the addition of the new storage computer to the storage cluster, selecting a second map from the plurality of pre-defined maps defining a stripe pattern for storing data on a storage cluster consisting of N+1 storage computers; and
    in response to selecting the second map, re-striping the data across the storage computers according to the second map.

6. A non-transitory computer-readable storage medium having stored thereon:
    a plurality of pre-defined maps, each pre-defined map defining a stripe pattern for storing data on a storage cluster consisting of a specific number of storage computers, wherein the storage capacity of the storage cluster is divided into storage zones, the stripe pattern for each pre-defined map is further defined such that each storage zone is stored on at least two storage computers in the storage cluster, and the stripe pattern for each pre-defined map designates for each storage zone a same one of the at least two storage computers as an owner of the storage zone and the others of the at least two storage computers as peers for the storage zone; and
    computer-executable instructions that, when executed by storage computers in a storage cluster comprising N storage computers, N being greater than or equal to two, cause the storage computers to:
        stripe data across the storage computers of the storage cluster according to a first map from the plurality of pre-defined maps defining a stripe pattern for storing data on a storage cluster consisting of N storage computers;
        add a new storage computer to the storage cluster; and
        in response to the addition of the new storage computer to the storage cluster, re-stripe the data across the storage computers according to a second map from the plurality of pre-defined maps defining a stripe pattern for storing data on a storage cluster consisting of N+1 storage computers, wherein the stripe patterns of the first map and the second map are defined such that, during re-striping, movement of data never occurs between two storage computers that existed in the storage cluster prior to the addition of the new storage computer, regardless of the number of storage computers that exist in the storage cluster, and wherein the plurality of pre-defined maps are generated and stored on the computer-readable storage medium before the new storage computer is added to the storage cluster.

7. The non-transitory computer-readable storage medium of claim 6, having stored thereon further computer-executable instructions that cause the storage computers to:

receive an input/output operation at a storage computer designated by the second map as a peer node for a destination storage zone;

redirect based on the second map the input/output operation to the storage computer designated by the second map as the owner node for the destination storage zone;

perform the input/output operation at the storage computer designated by the second map as the owner node for the destination storage zone; and mirror the input/output operation to the storage computers designated by the second map as peer nodes for the destination storage zone.

8. The non-transitory computer-readable storage medium of claim 6, having stored thereon further computer-executable instructions that cause the storage computers to:

receive an input/output operation at a storage computer designated by the second map as an owner node for a destination storage zone;

perform the input/output operation at the storage computer designated by the second map as the owner node for the destination storage zone; and mirror the input/output operation to the storage computers designated by the second map as peer nodes for the destination storage zone.

9. The non-transitory computer-readable storage medium of claim 6, having stored thereon further computer-executable instructions that cause the storage computers to:

in response to the addition of the new storage computer to the storage cluster, select a second map from the plurality of pre-defined maps defining a stripe pattern for storing data on a storage cluster consisting of N+1 storage computers; and in response to selecting the second map, re-stripe the data across the storage computers according to the second map.

* * * * *